(12) United States Patent
Sprague et al.

(10) Patent No.: US 7,295,579 B2
(45) Date of Patent: Nov. 13, 2007

(54) METHODS AND SYSTEMS FOR COMMUNICATING SIGNALING INFORMATION USING A NORMALIZED SIGNALING PROTOCOL

(75) Inventors: David Michael Sprague, Raleigh, NC (US); Mark Edward Kanode, Apex, NC (US); Dan Alan Brendes, Raleigh, NC (US); Mark Ernest Davidson, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1092 days.

(21) Appl. No.: 10/164,226

(22) Filed: Jun. 5, 2002

(65) Prior Publication Data

US 2002/0186723 A1 Dec. 12, 2002

Related U.S. Application Data

(60) Provisional application No. 60/295,950, filed on Jun. 5, 2001.

(51) Int. Cl.
*H04J 3/12* (2006.01)
(52) U.S. Cl. ...................... 370/524; 370/467
(58) Field of Classification Search ............ None
See application file for complete search history.

(56) References Cited

U.S. PATENT DOCUMENTS

| | | | | |
|---|---|---|---|---|
| 5,377,186 A | * | 12/1994 | Wegner et al. ............. | 370/220 |
| 5,818,919 A | * | 10/1998 | Berberich et al. .......... | 379/211.02 |
| 6,724,752 B1 | * | 4/2004 | Turtiainen et al. .......... | 370/352 |
| 6,741,610 B1 | * | 5/2004 | Volftsun et al. ............ | 370/466 |
| 6,842,447 B1 | * | 1/2005 | Cannon ..................... | 370/352 |
| 6,967,956 B1 | | 11/2005 | Tinsley et al. | |
| 6,990,124 B1 | * | 1/2006 | Dalias et al. .............. | 370/522 |
| 7,085,279 B1 | * | 8/2006 | Kumar et al. ............. | 370/352 |

FOREIGN PATENT DOCUMENTS

WO    WO 02/21857 A1    3/2002

OTHER PUBLICATIONS

Commonly-assigned, co-pending U.S. Appl. No. 09/658,522 for "Scalable Call Processing Node," (Unpublished, filed Sep. 8, 2000).

* cited by examiner

*Primary Examiner*—Brian Nguyen
(74) *Attorney, Agent, or Firm*—Jenkins, Wilson, Taylor & Hunt, P.A.

(57) ABSTRACT

A normalizing signaling gateway (NSG) routing node receives a first signaling message formatted according to a first variant of a common or standard signaling protocol, such as ISUP, and creates a second signaling message based on the first message. The second signaling message includes a normalized component and a variant component. The second signaling message may then be routed to a second NSG routing node or to a media gateway controller. Because the NSG routing node converts messages to and from variants of a standard signaling protocol, the media gateway controller is not required to support all of the variants of the standard signaling protocol, and its complexity is reduced.

28 Claims, 19 Drawing Sheets

Routing Table

| KEY(s) | | DATA FIELDS | | | | |
|---|---|---|---|---|---|---|
| ITU-I | ITU-N | Route Cost |␣LinkSet Status | Adjacent Status | Overall Status | LinkSet Name |
| 5-0-1 | 2-4-7-DE | 10 | A | A | A | LS1 |
| 5-0-1 | 2-4-7-DE | 20 | P | A | P | LS2 |
| 5-0-3 | 2-4-7-DE | 30 | A | A | A | LS3 |
| 5-0-3 | 2-4-7-DE | 10 | A | P | P | LS4 |
| 5-0-2 | 2-4-9-DE | 20 | A | A | A | LS5 |
| 5-0-2 | 2-4-9-DE | 30 | A | A | A | LS6 |
| 7-0-1 | 2-0-1-UK | 10 | A | A | A | LS8 |
| 7-0-2 | 3-0-1-UK | 10 | A | A | A | LS8 |

Figure 6

LinkSet Table

| KEY(s) 372 374 | | DATA FIELDS 376 378 380 382 | | | |
|---|---|---|---|---|---|
| Linkset Name | Link | IMT / Card Address | Port | Link Status | Adjacent Point Code |
| LS1 | 0 | 1305 | A | A | 2-4-7-DE |
| LS1 | 1 | 1307 | B | U | 2-4-7-DE |
| LS2 | 1 | 1505 | B | A | 2-4-7-DE |
| LS2 | 2 | 2300 | A | A | 2-4-7-DE |
| LS5 | 0 | 3301 | B | A | 2-4-9-DE |
| LS5 | 1 | 3312 | A | A | 2-4-9-DE |
| LS8 | 1 | 1105 | A | A | 2-0-1-UK |

Figure 7

| Keys | | | | | | Data Fields | | |
|---|---|---|---|---|---|---|---|---|
| DPC | OPC | SI | CICS | CICE | SSN | SOCKET ID | NORM | PSTN |
| 2-4-3 | 6-1-1 | 5 | 23 | 24 | - | Sock1 | Yes | 0104 |
| 2-1-2 | 6-1-1 | 5 | 26 | 28 | - | Sock2 | Yes | 0104 |
| 2-1-3 | 6-1-1 | 5 | 56 | 58 | - | Sock3 | No | N/A |
| 2-1-1 | 6-1-1 | 5 | 11 | 15 | - | Sock4 | No | N/A |
| 2-4-7 | 7-1-1 | 5 | 25 | 28 | - | Sock5 | Yes | 0104 |
| 2-4-7 | 6-1-1 | 5 | 12 | 13 | - | Sock6 | Yes | 0104 |

422 DPC, 424 OPC, 426 SI, 428 CICS, 430 CICE, 432 SSN, 434 SOCKET ID, 436 NORM, 438 PSTN

Socket Table

| | KEY | DATA FIELDS | | | |
|---|---|---|---|---|---|
| | | ——— Local ——— | | ——— Distant ——— | |
| | Socket ID | IP Address | TCP Port | IP Address | TCP Port | Socket Status |
| | Sock1 | 10.10.10.10 | 24 | 10.10.10.1 | 24 | A |
| | Sock2 | 10.10.10.10 | 42 | 10.10.10.2 | 42 | A |
| | Sock3 | 10.10.10.10 | 12 | 10.10.10.3 | 12 | A |
| | Sock4 | 10.10.10.10 | 54 | 10.10.20.1 | 54 | A |
| | Sock5 | 10.10.10.10 | 16 | 10.10.20.2 | 16 | A |
| | Sock6 | 10.10.10.10 | 76 | 10.10.20.3 | 17 | U |

| PSTN Presentation ID | Message Type | Acronym | Code |
|---|---|---|---|
| 0104 | Address complete | ACM_M | 0x06 |
| 0104 | Answer | ANM_M | 0x09 |
| 0104 | Blocking acknowledgement | BLA_M | 0x15 |
| 0104 | Blocking | BLO_M | 0x13 |
| 0104 | Continuity check request | CCR_M | 0x11 |
| 0104 | Confusion | CFN_M | 0x2f |
| 0104 | Circuit group blocking | CGB_M | 0x18 |
| 0104 | Circuit group blocking ack | CGBA_M | 0x1a |
| 0104 | Circuit group unblocking | CGU_M | 0x19 |
| 0104 | Circuit group unblocking ack | CGUA_M | 0x1b |
| 0104 | Connect | CON_M | 0x07 |
| 0104 | Continuity | COT_M | 0x05 |
| 0104 | Call progress | CPG_M | 0x2c |
| 0104 | Charge information | CRG_M | 0x31 |
| 0104 | Facility request | FAR_M | 0x1f |
| 0104 | Forward transfer | FOT_M | 0x08 |
| 0104 | Facility reject | FRJ_M | 0x21 |
| 0104 | Circuit group reset ack | GRA_M | 0x29 |
| 0104 | Circuit group reset | GRS_M | 0x17 |
| 0104 | Initial address | IAM_M | 0x01 |
| 0104 | Information | INF_M | 0x04 |
| 0104 | Information request | INR_M | 0x03 |
| 0104 | Release | REL_M | 0x0c |
| 0104 | Resume | RES_M | 0x0e |
| 0104 | Release complete | RLC_M | 0x10 |
| 0104 | Reset circuit | RSC_M | 0x12 |
| 0104 | Subsequent address | SAM_M | 0x02 |
| 0104 | Segmentation | SGM_M | 0x38 |
| 0104 | Suspend | SUS_M | 0x0d |
| 0104 | Unblocking ack | UBA_M | 0x16 |
| 0104 | Unblocking | UBL_M | 0x14 |
| 0104 | User-to-user information | USR_M | 0x2d |

| Scenario | Msg. Source | Msg. Destination | Other Condition | Normalization Rule |
|---|---|---|---|---|
| M-1A | Variant; message decode fails. | N/A | | Discard MSU |
| M-2B | Normalized; message decode fails. | N/A | | Discard MSU |
| M-3A | Variant; message rcvd is *not-defined* in the Variant spec. | N/A | | The normalization process should NOT be performed. The Variant MSU should be transferred (unmodified) in a TALI XSRV-xnrm message with a single 'Raw MTP3 MSU data' section. |
| M-3B | N/A | | TALI XSRV-xnrm message contains a single 'Raw MTP3 MSU data' section. | The de-normalization process should NOT be performed. The raw MTP3 MSU data should be passed through (unmodified) to the PSTN. |
| M-4B | Normalized; message rcvd is *defined* in the Normalized spec. | Variant; message is *not-defined* in the Variant spec. | TALI XSRV-xnrm message DOES NOT contain a single 'Raw MTP3 MSU data' section. | Discard MSU |
| M-5A | Variant; message is *defined* in the Variant spec. | Normalized; message is *not-defined* in the Normalized spec. | | The normalization process should NOT be performed. The Variant MSU should be transferred (unmodified) in a TALI XSRV-xnrm message with a single 'Raw MTP3 MSU data' section. |
| M-5B | Normalized; message rcvd is *not-defined* in the Normalized spec. | N/A | TALI XSRV-xnrm message DOES NOT contain a single 'Raw MTP3 MSU data' section. | Discard MSU |
| M-10A | Variant; message rcvd contains an optional parameter that is *supported* for the Variant message. | Normalized; the optional parameter is *supported* for the Normalized message. | | The parameter data should be normalized |

Figure 14

| PSTN Presentation ID | Parameters | Acronym | Code | Parameter structure name | Parameter structure same as Normalized | Parameter literals same as Normalized |
|---|---|---|---|---|---|---|
| 104 | Automatic congestion level | ACL_P | 0x27 | t_german_acl_p | YES | YES |
| 104 | Access transport | AT_P | 0x03 | t_german_at_p | YES | YES |
| 104 | Backward call indicators | BCI_P | 0x11 | t_german_bci_p | NO | NO |
| 104 | Circuit group supervision msg | CGSM_P | 0x15 | t_german_cgsm_p | YES | YES |
| 104 | Cause indicators | CI_P | 0x12 | t_german_ci_p | YES | YES |
| 104 | Called party number | CLDPN_P | 0x04 | t_german_cldpn_p | YES | NO |
| 104 | Calling party's category | CLGPC_P | 0x09 | t_german_clgpc_p | YES | YES |
| 104 | Calling party number | CLGPN_P | 0x0a | t_german_clgpn_p | YES | NO |
| 104 | Connected number | CN_P | 0x21 | t_german_cn_p | YES | YES |
| 104 | Continuity indicator | COT_P | 0x10 | t_german_cot_p | YES | YES |
| 104 | Closed user group interlock | CUG1_P | 0x1a | t_german_cug1_p | YES | YES |
| 104 | Event info | EI_P | 0x24 | t_german_ei_p | YES | YES |
| 104 | End of optional parameters | EOP_P | 0x00 | t_german_eop_p | YES | YES |
| 104 | Facility indicator | FI_P | 0x18 | t_german_fi_p | NO | NO |
| 104 | Forward call indicators | FCI_P | 0x07 | t_german_fci_p | YES | NO |
| 104 | Generic digits | GD_P | 0xc1 | t_german_gd_p | YES | NO |
| 104 | Generic number | GN_P | 0xc0 | t_german_gn_p | YES | NO |
| 104 | Generic notification indicator | GNI_P | 0x2c | t_german_gni_p | YES | NO |
| 104 | Meter Pulse Indicator | GR_MPI_P | 0xfe | t_german_grm_mpi_p | NO | NO |
| 104 | Route Identity | GR_RTI_P | 0xfc | t_german_grm_rti_p | NO | NO |
| 104 | Tariff Indicator | GR_TI_P | 0xfc | t_german_grm_ti_p | NO | NO |
| 104 | Information indicators | INF_P | 0x0f | t_german_inf_p | NO | YES |
| 104 | Information request indicators | IRI_P | 0x0e | t_german_iri_p | NO | YES |
| 104 | Location number | LN_P | 0x3f | t_german_ln_p | YES | NO |
| 104 | Message compatibility info | MCI_P | 0x38 | t_german_mci_p | NO | YES |
| 104 | Nature of connection indicators | NOC_P | 0x06 | t_german_noc_p | YES | YES |
| 104 | Optional backward call ind | OBCI_P | 0x29 | t_german_obci_p | NO | NO |
| 104 | Optional forward call indicators | OFCI_P | 0x08 | t_german_ofci_p | YES | YES |
| 104 | Original called number | OCN_P | 0x28 | t_german_ocn_p | YES | NO |
| 104 | Parameter compatibility info | PCI_P | 0x39 | t_german_pci_p | NO | YES |
| 104 | Range and status | RAS_P | 0x16 | t_german_ras_p | YES | YES |
| 104 | Redirection info | RI_P | 0x13 | t_german_ri_p | NO | NO |
| 104 | Redirecting number | RN_P | 0x0b | t_german_rn_p | YES | YES |
| 104 | Subsequent number | SN_P | 0x05 | t_german_sn_p | YES | YES |
| 104 | Suspend/Resume indicators | SR_P | 0x22 | t_german_sr_p | YES | NO |
| 104 | Transmission medium req | TMR_P | 0x02 | t_german_tmr_p | YES | YES |
| 104 | User service information | USI_P | 0x1d | t_german_usi_p | NO | NO |
| 104 | User-to-user information | USR_P | 0x20 | t_german_usr_p | YES | YES |
| 104 | User-to-user indicators | UTU_P | 0x2a | t_german_utu_p | YES | YES |

Figure 15

| PSTN Presentation ID | Parameter Acronym | Field | Discrepancy between German and Normalized | German to Norm Scenario | Norm to German Scenario |
|---|---|---|---|---|---|
| 104 | BCI_P | Called party status indicator field | Code "10" reserved in German; defined in Normalized | P-1A | P-1B |
| 104 | BCI_P | End-to-end method indicator field | Codes "01-11" reserved in German; defined in Normalized | P-2A | P-2B |
| 104 | BCI_P | SCCP method indicator field | Codes "01-11" reserved in German; defined in Normalized | P-1A | P-1B |
| 104 | BCI_P | End-to-end information indicator field | Field is reserved in German; defined in Normalized | P-11A | P-11B |
| 104 | BCI_P | Holding indicator field | Field is reserved in German; defined in Normalized | P-11A | P-11B |

Figure 16

| Scenario | Msg. Source | Msg. Destination | Other Condition | Translation |
|---|---|---|---|---|
| P-1A | Variant code is Reserved, Spare, Not Used, or Not Required | Normalized code is Defined | "Unknown" or "No Indication" code exists. | Pass code through to parameter in 'Normalized ISUP MSU data' section. If parameter is *not-supported* in Variant message, indicate presence of parameter in original Variant MSU by placing parameter entry in 'ISUP Variant Specific data' section without data (set length to zero). |
| P-1B | Normalized code is Defined | Variant code is Reserved, Spare, Not Used, or Not Required | "Unknown" or "No Indication" code exists. | Pass code through (unmodified) from 'Normalized ISUP MSU data' section to Variant parameter |
| P-2A | Variant code is Reserved, Spare, Not Used, or Not Required | Normalized code is Defined | "Unknown" or "No Indication" code DOES NOT exist. | Pass code through to parameter in 'Normalized ISUP MSU data' section. If parameter is *not-supported* in Variant message, indicate presence of parameter in original Variant MSU by placing parameter entry in 'ISUP Variant Specific data' section without data (set length to zero). |
| P-2B | Normalized code is Defined | Variant code is Reserved, Spare, Not Used, or Not Required | "Unknown" or "No Indication" code DOES NOT exist. | Pass code through (unmodified) from 'Normalized ISUP MSU data' section to Variant parameter |
| P-3A | Variant code is Defined | Normalized code is Reserved, Spare, Not Used, or Not Required | "Unknown" or "No Indication" code exists. | Pass code through to parameter in 'Normalized ISUP MSU data' section. If parameter is *not-supported* in Variant message, indicate presence of parameter in original Variant MSU by placing parameter entry in 'ISUP Variant Specific data' section without data (set length to zero). |
| P-3B | Normalized code is Reserved, Spare, Not Used, or Not Required | Variant code is Defined | "Unknown" or "No Indication" code exists. | Pass code through (unmodified) from 'Normalized ISUP MSU data' section to Variant parameter |
| P-4A | Variant code is Defined | Normalized code is Reserved, Spare, Not Used, or Not Required | "Unknown" or "No Indication" code DOES NOT exist. | Pass code through to parameter in 'Normalized ISUP MSU data' section. If parameter is *not-supported* in Variant message, indicate presence of parameter in original Variant MSU by placing parameter entry in 'ISUP Variant Specific data' section without data (set length to zero). |

Figure 17

METHODS AND SYSTEMS FOR COMMUNICATING SIGNALING INFORMATION USING A NORMALIZED SIGNALING PROTOCOL

RELATED APPLICATIONS

This application claims the benefit of U.S. provisional patent application 60/295,950, filed Jun. 5, 2001, the disclosure of which is incorporated herein by reference in its entirety.

TECHNICAL FIELD

The present invention is related to a need in the telecommunications industry to enable signaling messages to be routed between two or more signaling networks that employ variants of a common signaling protocol.

BACKGROUND ART

The conventional telecommunications network includes two distinct communication pathways or subnetworks—a voice network and a signaling network. These two networks function in a cooperative manner to facilitate communications between users. As implied by its name, the voice network handles the transmission of voice (or user data) information between users. The signaling network has a number of responsibilities, which include call setup, call teardown, and database access. In simple terms, the signaling network facilitates the dynamic linking together of a number of discrete voice-type communication circuits, such that a voice-type connection is established between the calling and called party. Additionally, the signaling network provides a framework through which non-voice-related information may be transported, with this data and transport functionality being transparent to the users. This signaling technique is often referred to as out-of-band signaling, where the term "band" implies voice band. The signaling protocol most commonly employed in communication networks around the world is the signaling system 7 (SS7) signaling protocol. Different variations of SS7 may be used in different regions.

From a hardware perspective, an SS7 network includes a plurality of SS7 nodes, generically referred to as signaling points (SPs), that are interconnected using signaling links, also referred to as SS7 links. At least three types of SPs are provided in an SS7 network: service switching points (SSPs), signal transfer points (STPs) and service control points (SCPs). Within an SS7 signaling network, such SP nodes are assigned an SS7 network address in the form of a point code (PC).

An SSP is normally installed in Class 4 tandem or Class 5 end offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed as mated pairs. Finally, an SCP provides access to databases, such as 800 number translation databases, 800 number carrier identification databases, credit card verification databases, etc.

Signaling links are transmission facilities used to connect one SP to another. Conventional signaling links are dedicated bidirectional facilities operating at 56 kbps in the U.S. and Canada and at 64 kbps when clear channel capability is deployed. The relatively recent emergence of Internet protocol (IP)-based telephony (i.e., IP telephony) has led to a number of new network elements, some of which communicate via both traditional public switched telephone network (PSTN) SS7 and IP based signaling protocols. For instance, a media gateway controller (MGC) is a network element that effectively serves as a bridge between the PSTN and an IP telephony network. That is, an MGC node communicates with and controls one or more media gateway (MG) nodes. Those familiar with PSTN network architectures will appreciate that the functionality provided by an MGC/MG pair (i.e., a "softswitch") is similar to the functionality provided by a traditional PSTN tandem office switch. In the case of an MGC node, SS7 call control signaling messages (e.g., ISUP and TCAP messages) are received and processed by the MGC, which in turn uses one or more non-SS7 signaling protocols (e.g., MGCP, UNI 4.0, ALTA, etc.) to communicate with an associated MG node.

With particular regard to the SS7 protocol and the issue of SS7 protocol variants, it will be appreciated that in an international communications environment it is often the case that different countries employ variations of a common or standard call control protocol, such as the ISDN user part (ISUP) protocol. The different variations are referred to as ISUP variants. Such protocol variations pose significant problems for those network operators attempting to provide international connectivity.

In North America, ISUP messages and protocols are defined by Telcordia Technologies *Specification of the Signaling System Number Seven*, GR-246-CORE, Volume 3, T1.113.1-T1.113.5 (December 2001), the disclosure of which is incorporated herein by reference in its entirety. Likewise, in Europe, the International Telecommunications Union (ITU) Q.76x series of specifications defines the ISUP messages and protocols to be used by "international" signaling gateways. Within European non-gateway switching environments, the use of different ITU national ISUP variants is widespread. It will be appreciated that while this problem exists throughout the world, it is especially acute in Europe where practically each country employs its own ISUP variant.

In general, the differences from variant to variant may include differences in message types or sets of message types, differences in parameters or different sets of parameters being used in each message, and differences in the interpretation of the encoding of fields within message parameters. For example, there are approximately 45 message types and 62 parameters defined in the ITU Q.763 standard. Many of these parameters are used in multiple message types. Within all ISUP protocols there are essentially three types of message parameters: mandatory fixed (i.e., the parameter is of a fixed size and must be present in the message), mandatory variable (i.e., the parameter is of a variable size and must be present in the message), and optional. The combination of message type and the ISUP specification being used uniquely identifies the parameters that are applicable to a given ISUP message. That is, the message type and associated ISUP specification together imply the number and sequence of mandatory fixed and mandatory variable parameters. When a particular message contains more than one mandatory fixed parameter, the order of those parameters is fixed and is detailed in the relevant ISUP specification. Similarly, when a particular message contains more than one mandatory variable parameters, the order of those parameters is fixed and is detailed in the relevant ISUP specification. The order of optional parameters within an ISUP message is not fixed. Unlike the mandatory fixed and mandatory variable sections of the ISUP messages, the option parameter section provides the parameter ID as the first field within each parameter. Again, from variant to variant, different sets of messages are used, different sets of parameters are associated with a given message type, and different field and bit encoding schemes are associated with a given parameter.

ISUP protocol variants are not limited to country specific scenarios. For instance, different network operators within the same national network environment may implement or support slightly different variations of a common or standard call control protocol. This situation may occur in networks using IP telephony protocols.

FIG. 1 illustrates an exemplary international communication network architecture that employs both traditional SS7 and IP based signaling nodes. More particularly, FIG. 1 includes a British signaling network 100 and a German signaling network 101. British signaling network 100 includes a pair of end office signaling points 102 and 104, an SS7 signal transfer point (STP) 106, a gateway STP node 108, and a media gateway 112. Likewise, German signaling network 101 includes a pair of end office signaling points 122 and 124, an SS7 signal transfer point (STP) 126, a gateway STP node 128, and a media gateway 132. A media gateway controller node 130 facilitates international call setup and teardown.

In this example, it is assumed that a British ISUP protocol variant is employed in British signaling network 100, while a German ISUP protocol variant is employed in German network 101, and that these two ISUP protocol variants are different. As such, MGC node 130 must be capable of processing both British and German ISUP variant call signaling messages. In addition, extending this network architecture to include additional national networks requires that MGC node 130 be capable of processing an even greater number of ISUP variants. Such multiple protocol variant support is inherently complex, costly, difficult to administer, and is not particularly scalable with regard to the support of new or additional ISUP protocol variants (i.e., the support of new or additional national networks).

Therefore, what is needed is a system and method of minimizing the number of ISUP protocol variants that must be supported by a signaling message switching point (e.g., a media gateway controller or softswitch) that serves multiple communication networks employing different ISUP protocol variants.

DISCLOSURE OF THE INVENTION

The present invention includes a communications network element that is capable of providing intra- and inter-network message routing functionality in a networking environment having multiple signaling sub-networks where these different signaling sub-networks employ variations of a common or standard signaling protocol. In one scenario, the sub-networks correspond to different national signaling networks. A normalizing signaling gateway (NSG) routing node of the present invention receives a first signaling message that employs a first variant of a common or standard signaling protocol and subsequently creates a second "normalized" signaling message based on the first message. This normalized signaling message includes a normalized component and a variant component. The second signaling message may be routed to a call control node, such as a media gateway controller or softswitch. The call control node receives and processes the normalized signaling message. Because all messages received by the call control node are preferably converted to the normalized format, the call control node can serve multiple national networks regardless of the signaling protocol variants used in those national networks.

In one example, the normalized component of a signaling message generated by an NSG node includes information that is common to all of the protocol variants of the networks served the NSG node.

The functions for providing normalized signaling message support are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing normalized signaling message functionality are described below as being associated with cards or subsystems within an STP or signaling gateway routing node. It is understood that these cards or subsystems include hardware for storing and executing the processes and modules. For example, each card or subsystems described below may include one or more microprocessors, such as an x86 microprocessor available from Intel Corporation, and associated memory.

Accordingly, it is an object of the present invention to provide a routing node for receiving a first signaling message formatted in a variant of a standard signaling protocol and for generating a second message based on the first message, where the second message includes a normalized component and a variant component.

It is another object of the present invention to provide a routing node for receiving a first signaling message that includes a normalized component and a variant component and for generating a second message based on the first message, where the second message is formatted in a variant of a standard signaling protocol.

It is another object of the present invention to provide a routing node for delivering ISDN user part (ISUP) messages that arrive at the routing node from a public switched telephone network (PSTN) in a country specific ISUP variant format to an IP device in a normalized ISUP format.

It is another object of the present invention to provide a routing node for enabling signaling message traffic received from an IP device in a normalized ISUP format to be delivered to a PSTN link in the appropriate country variant format.

It is another object of the present invention to provide a routing node for transporting normalized ISUP messages within Internet protocol (IP) packets, where information in the IP packets identify the source national network, the destination national network, and the ISUP variant of the destination national network.

It is another object of the present invention to provide a routing node that allows an IP device (e.g., a media gateway controller or softswitch providing Class 4 tandem functionality) connected to the routing node to perform call setup for multiple national networks with minimal knowledge of the ISUP variants used in the national networks.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 6 is a diagram illustrating a sample routing table associated with LIM 330 illustrated in FIG. 5.

FIG. 7 is diagram illustrating a sample linkset table associated with LIM 330 illustrated in FIG. 5.

FIG. 10 illustrates an exemplary routing key table associated with DCM 400 illustrated in FIG. 9.

FIG. 11 illustrates an exemplary socket table associated with DCM 400 illustrated in FIG. 9.

FIG. 13 is a table illustrating messages that are common to both a German ISUP variant and a normalized ISUP protocol.

FIG. 14 is a table illustrating message normalization rules.

FIG. 15 is a table illustrating message parameter translation requirements.

FIG. 16 is a table illustrating exemplary parameter translation information.

FIG. 17 is a table illustrating exemplary parameter translation rules.

DETAILED DESCRIPTION OF THE INVENTION

Figure 1:
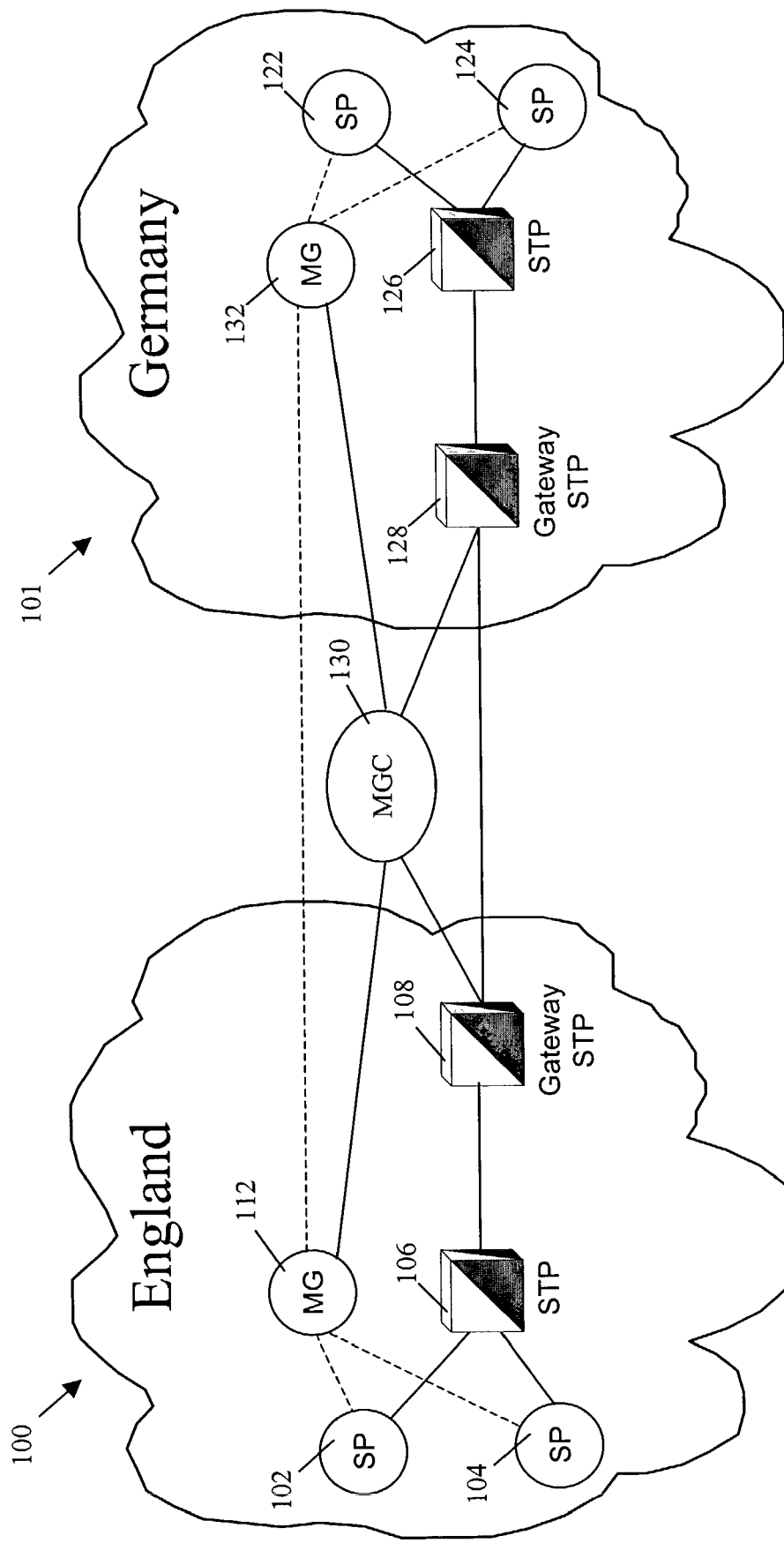
FIG. 1 is a network diagram illustrating a conventional signaling infrastructure involving two national signaling networks that use different signaling protocol variants.
Figure 2:
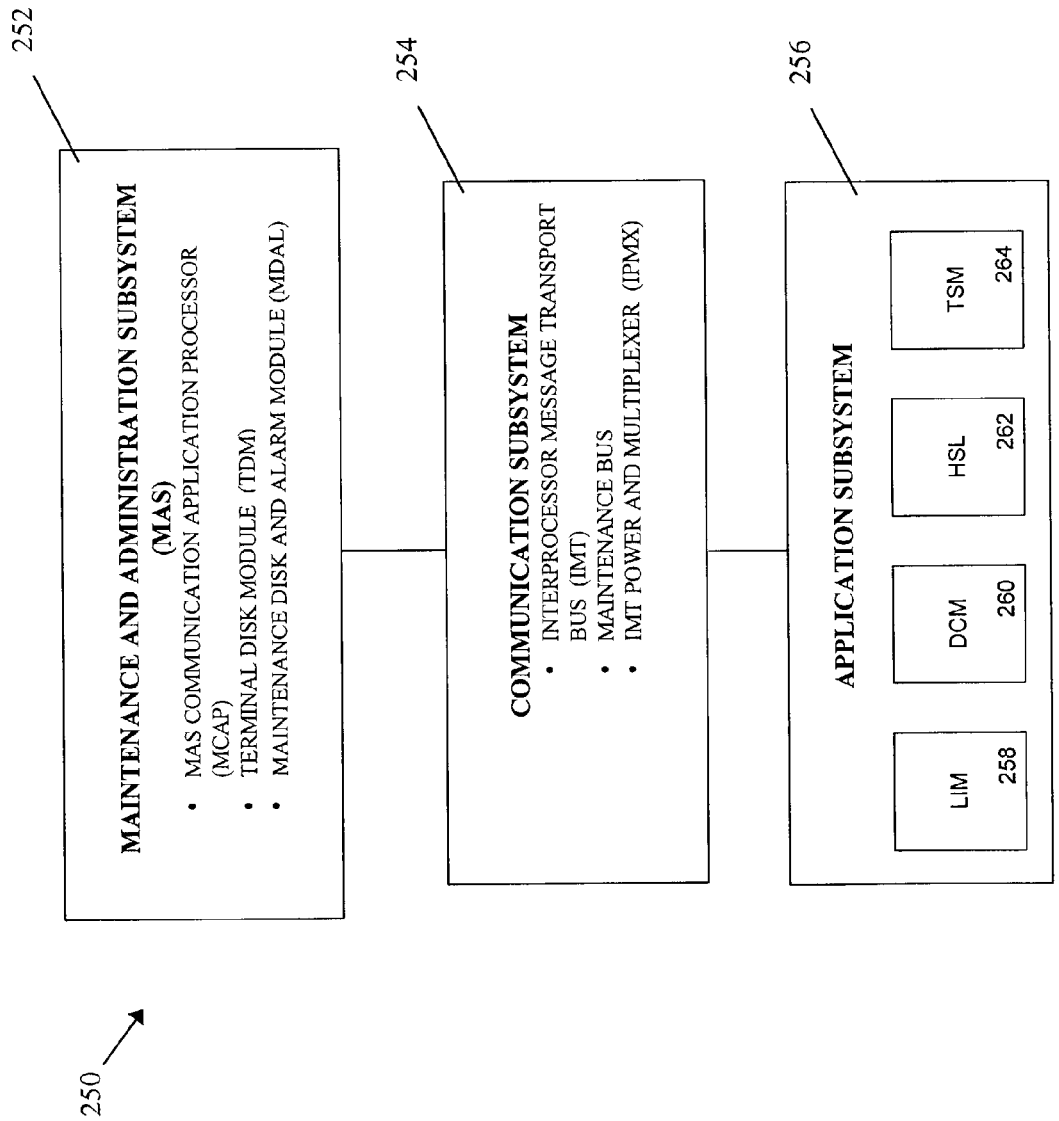
FIG. 2 is a block diagram of a signaling gateway routing node architecture suitable for use with embodiments of the present invention.

Disclosed herein are several embodiments of the present invention, each of which may be implemented using an underlying hardware platform similar to that of a conventional telecommunications network packet routing switch, such as a signaling gateway routing node (SG). FIG. 2 is a block diagram of a conventional signaling gateway suitable for use with embodiments of the present invention. In FIG. 2, signaling gateway 250 includes the following subsystems: a maintenance and administration subsystem (MAS) 252; a communication subsystem 254 and an application subsystem 256. MAS 252 provides maintenance communications, initial program load, peripheral services, alarm processing and system disks. Communication subsystem 254 includes dual interprocessor message transport (IMT) buses that interconnect processor cards within signaling gateway 250. In order to provide reliable interconnection in the case of a processor card failure, the buses are configured as counter-rotating dual rings and each card is connected to both rings.

Application subsystem 256 includes application cards that are capable of communicating with the other cards through the IMT buses. Numerous types of application cards can be incorporated into SG 250, including a link interface module (LIM) 258 that interfaces with SS7 links and X.25 links, a data communication module (DCM) 260 that provides an Internet Protocol (IP) interface using Transmission Control Protocol (TCP), and a high speed link (HSL) module 262 that provides asynchronous transfer mode (ATM) communication facilities for sending and receiving SS7 and IP messages over an ATM network. A translation service module (TSM) or database service module (DSM) 264 may also be provided to support triggered local number portability service, global title translation, gateway screening and other services. A commercially available hardware platform suitable for use with embodiments of the present invention that includes the subsystems illustrated in FIG. 2 is the Eagle® platform available from Tekelec of Calabasas, Calif.

Normalizing Routing Node Architecture

Figure 3:
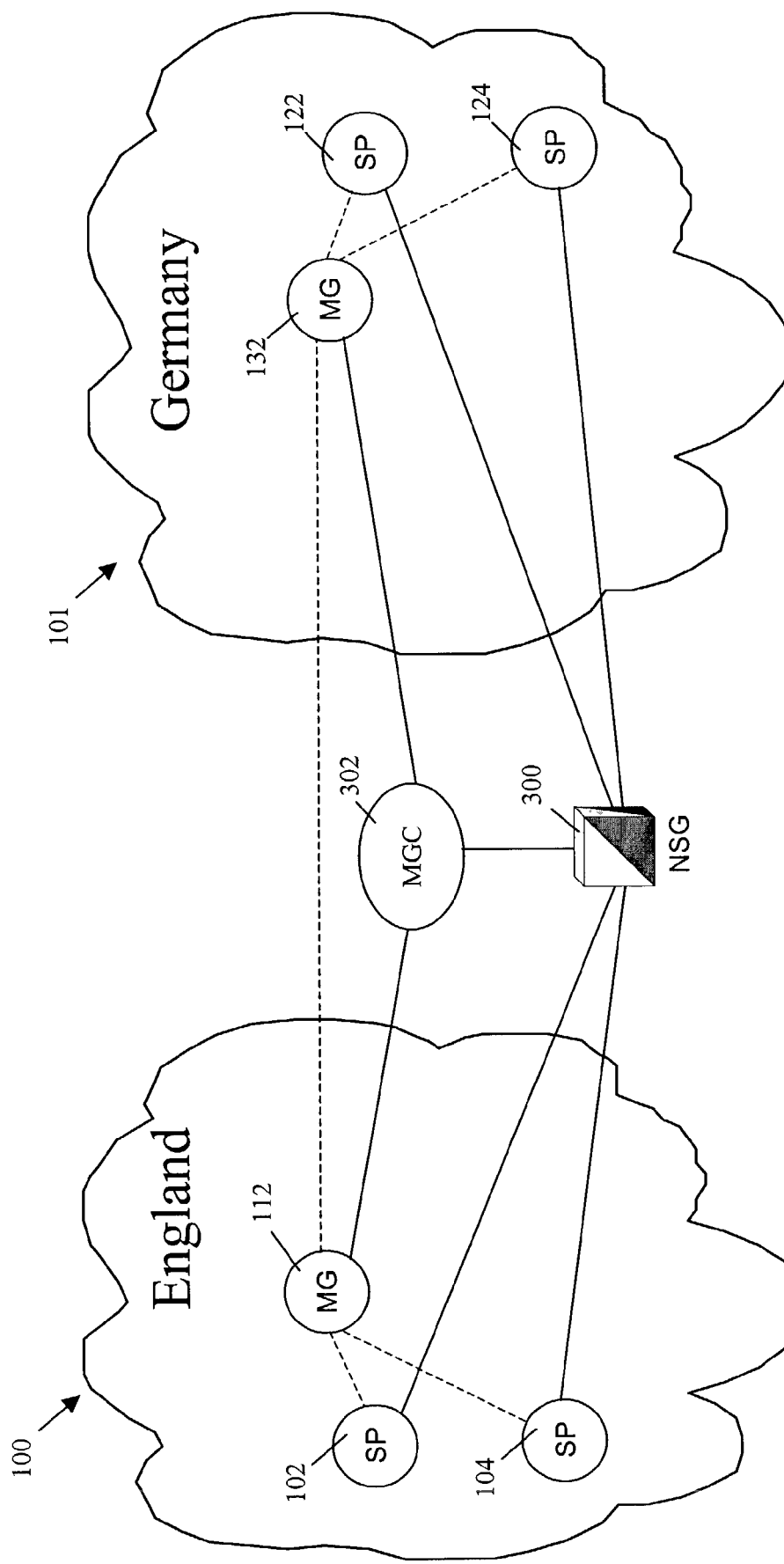
FIG. 3 is a network diagram illustrating two national signaling networks served by a normalizing signaling gateway routing node according to an embodiment of the present invention.

FIG. 3 is a network diagram illustrating a normalizing signaling gateway (NSG) routing node according to an embodiment of the present invention. In the example network implementation scenario shown in FIG. 3, an NSG routing node 300 is coupled to a British national signaling network 100 and a German national signaling network 101. British network 100 includes a pair of signaling points (SP) 102 and 104, as well as a media gateway node 112, while German network 101 includes a pair of signaling points (SP) 122 and 124, and a media gateway node 132. For the purposes of illustration, it is assumed that the British signaling network utilizes, for call setup and teardown, an SS7 ISDN user part (ISUP) variant described in *PNO-ISC Specification Number* 007—*ISDN User Part, PNO-ISC/SPEC/ 007*, Network Interoperability Consultative Committee, October 1997, the disclosure of which is incorporated herein by reference in its entirety. Likewise, it is assumed that German signaling network utilizes an SS7 ISDN user part (ISUP) variant described in *ISDN User Part 3+, Section A: Formats and Codes (Germany)*, 28/15517-ANT21215 Uen, Ericsson, November 1992, the disclosure of which is incorporated herein by reference in its entirety.

The present invention is not limited to converting between the British and German ISUP variants and the normalized ISUP protocol. The methods and systems described herein can be used to convert between any suitable ISUP variant and a normalized ISUP protocol. For example, the methods and systems described herein may be used to convert between any ISUP variant based on ITU Recommendations Q.761-Q.764, the disclosures of which are incorporated herein by reference in their entirety, and a normalized ISUP protocol. These ITU documents collectively define the functions, procedures, formats, and codes of the ITU ISUP protocol.

A media gateway (MG) performs media conversion between an Internet protocol (IP) based packet switched data network and a switched circuit network, such as the public switched telephone network (PSTN). As such, an MG node effectively functions as a gateway between an IP communications network and the PSTN, transforming telephone call payloads (e.g., voice and fax) into a format that is suitable for transmission across a data network, and vice versa. An MG typically operates under the control of a media gateway controller (MGC) or softswitch call agent controls the setting up and tearing down of media connections between an IP network and the PSTN.

In FIG. 3, NSG routing node 300 and MGC node 302 directly service both the British and German networks 100 and 101. More particularly, NSG routing node 300 is coupled to British SP nodes 102 and 104 and German SP nodes 122 and 124 via dedicated SS7 signaling links. As such, NSG node 300 can receive, process and route SS7 ISUP signaling messages formatted in either the British ISUP variant or the German ISUP variant. NSG node 300 is also coupled to MGC node 302 via an Internet protocol (IP) based signaling link. In one embodiment, NSG node 300 may utilize the transport adapter layer interface (TALI) signaling protocol, for example as described in IETF RFC 3094, the disclosure of which is incorporated herein in its entirety. Briefly, the TALI protocol runs on top of TCP/IP to send and receive SS7 messages over an IP network. As such, one or more transmission control protocol IP (TCP/IP) socket connections may be established and maintained between NSG node 300 and MGC 302. MGC node 302 is coupled to British MG node 112 and German MG node 132 via signaling links that employ signaling protocols, such as MGCP, UNI 4.0, ALTA, etc. As briefly discussed above, MG nodes such as those illustrated in FIG. 3 establish bearer traffic communication pathways (indicated by dashed lines), which carry voice and data between end users. MG nodes 112 and 132 may establish bearer communications between SP nodes within the same country and between SP nodes residing in different countries.

With particular regard to communication between the NSG routing node 300 and MGC node 302, signaling messages passed between these two nodes preferably are in a normalized format. This normalized format is generated by NSG 300 based on the formats of British network 100 and German network 101. Details of this normalized format will be described below.

Figure 4:
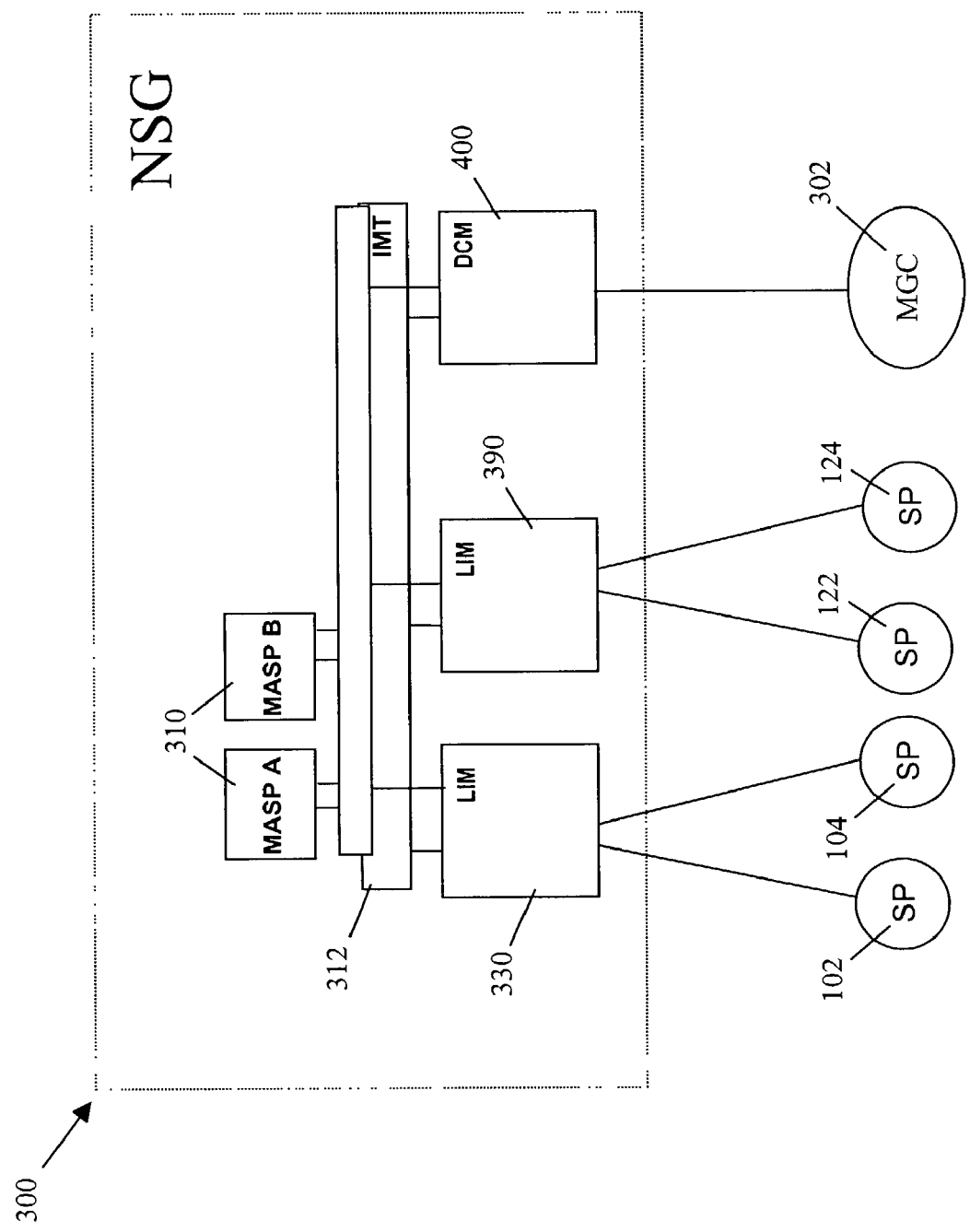
FIG. 4 is a block diagram of a normalizing signaling gateway routing node according to an embodiment of the present invention.

FIG. 4 illustrates an exemplary internal architecture of an NSG routing node according to an embodiment of the present invention. In FIG. 4, NSG routing node 300 that includes high-speed interprocessor message transport (IMT) communications buses 312. A number of distributed processing modules or cards may be connected to IMT bus 312. In FIG. 4, these processors include a pair of maintenance and administration subsystem processors (MASPs) 310, a first SS7-capable link Interface module (LIM) 330, a second SS7-capable link Interface module (LIM) 390, and an transport adapter layer interface (TALI)-Internet protocol (IP)-capable data communication module (DCM) 400. These modules are physically connected to the IMT buses 312 such that signaling and other types of messages may be routed internally between active cards or modules. For simplicity of illustration, only a single pair of LIM processors and a single DCM module are included in FIG. 4. However, it should be appreciated that the distributed, multi-processor architecture of the NSG routing node 300 facilitates the deployment of multiple LIM, DCM and other processing and communication cards (e.g., SS7 over ATM link modules, SIP over IP link modules, translation service modules, etc.), all of which may be simultaneously connected to and communicating via IMT buses 312.

From a hardware perspective, LIMs 330 and 390 and DCM 440 may each comprise a printed circuit board physically connected to IMT buses 312. Each printed circuit board may include a communication processor programmed to send and receive messages via IMT buses 312. Each printed circuit board may also include an application processor programmed to perform various functions. For example, the application processor of LIM 330 may be programmed to perform the functions described herein for identifying and routing messages to the appropriate processing module within routing node 300 for conversion to and from the normalized ISUP protocol format. The application processor of DCM 400 may be programmed to convert messages to and from normalized ISUP format.

MASP pair 310 implement the maintenance and administration subsystem functions described above. As MASP pair 310 are not particularly relevant to a discussion of the flexible routing attributes of the present invention, a detailed discussion of their function is not provided herein.

SS7 Link Interface Module (LIM) Architecture

Figure 5:
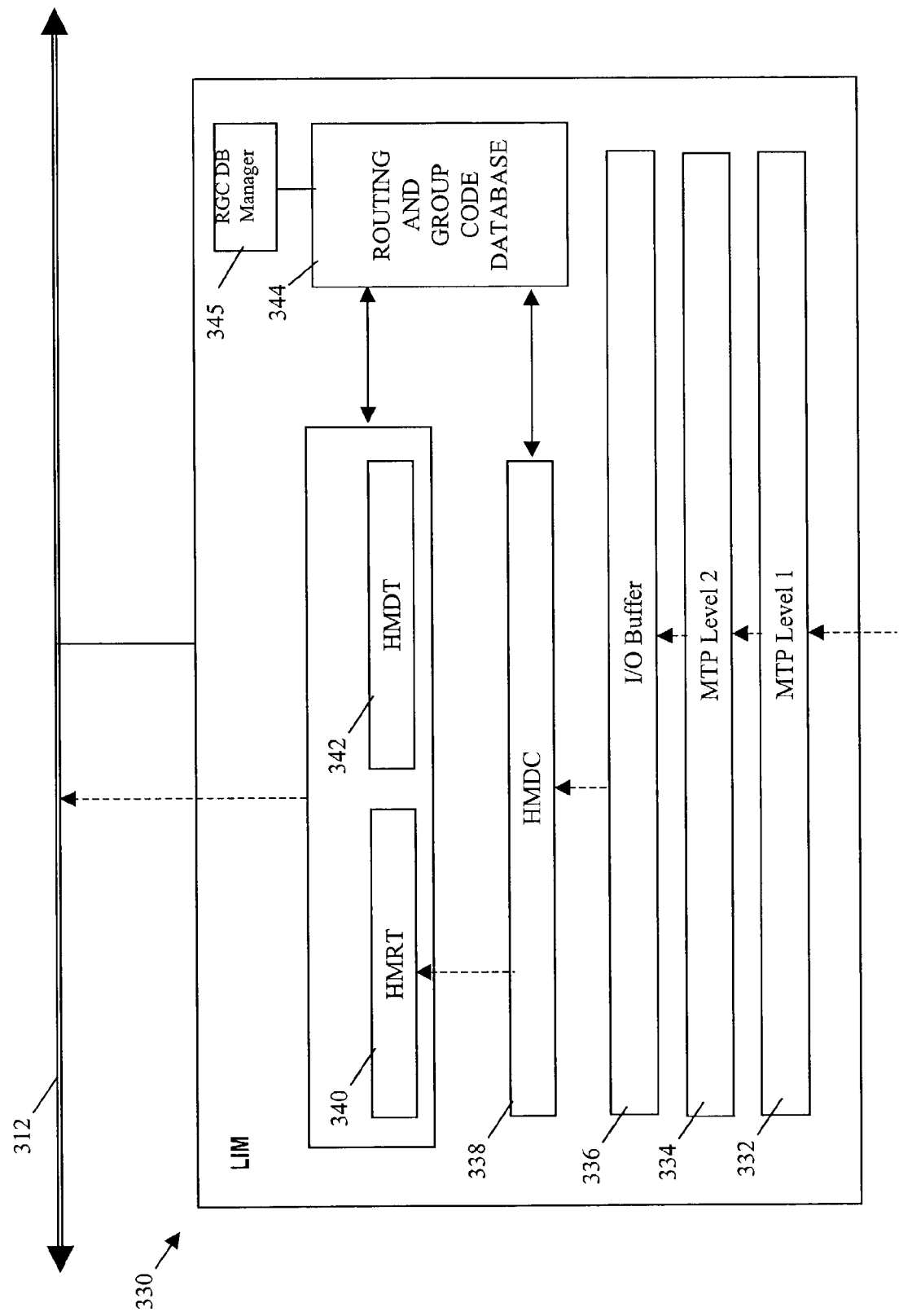
FIG. 5 is a block diagram of an SS7 link interface module (LIM) illustrating message flow associated with the receipt of a signaling message according to an embodiment of the present invention.

Referring to FIG. 5 and focusing now on LIM card functionality, LIM 330 includes an SS7 message transfer part (MTP) level 1 module 332, an SS7 message transfer part (MTP) level 2 module 334, an I/O buffer or queue 336, an SS7 MTP level 3 message handling and discrimination (HMDC) module 338, a message handling and routing (HMRT) module 340, and a message handling and distribution (HMDT) module 342. MTP level 1 module 332 sends and receives bits over a particular physical interface, such as a DS0 communications link. MTP level 2 module 334 performs error correction, error detection, and message sequencing. I/O buffer 336 temporarily incoming and outgoing SS7 signaling message packets. HMDC module 338 receives signaling messages from the lower processing layers and performs a discrimination function, effectively determining whether an incoming SS7 message requires internal processing or is simply to be through switched. HMRT module 340 messages routers received from the discrimination module 338 that do not require further processing at the NSG routing node and are simply to be through switched. HMDT module 342 distributes SS7 messages to the appropriate processing module when the SS7 messages require further processing by NSG routing node 300.

In addition to the routing software, LIM 330 also includes one or more routing databases. In one embodiment, LIM 330 includes a routing and group code (RGC) database 344 and an associated database manager 345. RGC database 344 includes a routing table 350 and a linkset table 370, respectively illustrated in FIGS. 6 and 7. Tables 350 and 370 contain signaling route and signaling route status information along with internal IMT bus routing information. These tables are used to route SS7 signaling messages received by the LIM 330.

Routing and group code database manager 345 administers the routing data within the routing and linkset tables 350 and 370. RGC manager 345 may also notify other communication modules within the routing node of changes in the status of links and other nodes in the serviced SS7 network(s).

Referring to FIG. 6, in one example, routing table 350 includes a plurality of key fields, any of which may be used to index the table. More particularly, routing table 350 includes an International Telecommunications Union international (ITU-I) point code key field 352, and an International Telecommunications Union national (ITU-N) point code key field 354. Routing table 350 also includes a route cost field 356, a linkset status field 358, an adjacent node status field 360, an overall status field 362, and a linkset identifier or pointer field 364.

The ITU national and international signaling protocols utilize 14-bit point codes. Accordingly, in one embodiment of an NSG routing node of the present invention, the ITU-N point code field 354 stores a 14-bit ITU-N compliant point code address and a 10-bit group code. This group code is a two character-ASCII code that is used to identify a particular country or national network or point code group. For instance, in the sample data shown in table 350, each ITU-N point code entry includes either a "DE" or a "UK" group code that is appended to the point code value, where "DE" indicates the German network, and "UK" indicates the British network. As such, two identical ITU-N point code values associated with two different networks may be simultaneously provisioned in routing table 350 provided these two ITU-N point code entries are assigned a different group code, which essentially defines the network within which each point code is valid. Group codes may be used in conjunction with ITU-N signaling messages to route messages to the appropriate point code group. However, such group codes may also be used in a similar manner with other signaling protocols (e.g., ANSI, ITU-I, etc.) to achieve this same duplicate point code routing capability. A more detailed discussion of group code based routing can be found in commonly-assigned, co-pending U.S. patent application Ser. No. 10/093,862 filed on Mar. 8, 2002, the disclosure of which is incorporated herein by reference in its entirety.

Referring to FIG. 7, linkset table 370 includes a compound key made of a linkset identifier 372 and a signaling link identifier 374. Linkset table 370 also includes IMT address and communication port fields 376 and 378 which contain IMT bus address and communication port information associated with communication modules connected to the IMT bus 312. More particularly, a record in the table 370 includes an IMT address and communication port value associated with a communication module that supports the specific link identified in the record key. For example, as shown in FIG. 7, link 0 of linkset 1 resides on a communication module that has an IMT bus address of 1305 and a communication port address of "A". Link status field 380 indicates that link 0 of linkset 1 is available for service. Table 370 also includes an adjacent point code (APC) field 382, which contains information for identifying the signaling node connected to the distant end of a signaling link. In one embodiment, the APC field 382 includes ITU-N point code values and the group codes associated with each point code.

In operation, a lookup in route table 350 returns an index value or pointer that is subsequently used in a lookup in linkset table 370. The ultimate result of this two-stage lookup procedure is an IMT bus address and communication port associated with a signaling link on a communication module. While this two-stage table lookup procedure effectively routes messages to their proper destinations, the present invention is not limited to any particular data structure or database access sequence. Any suitable data structure and lookup sequence for determining a card's destination address based on a destination point code in a received signaling message is intended to be within the scope of the invention.

Figure 8:
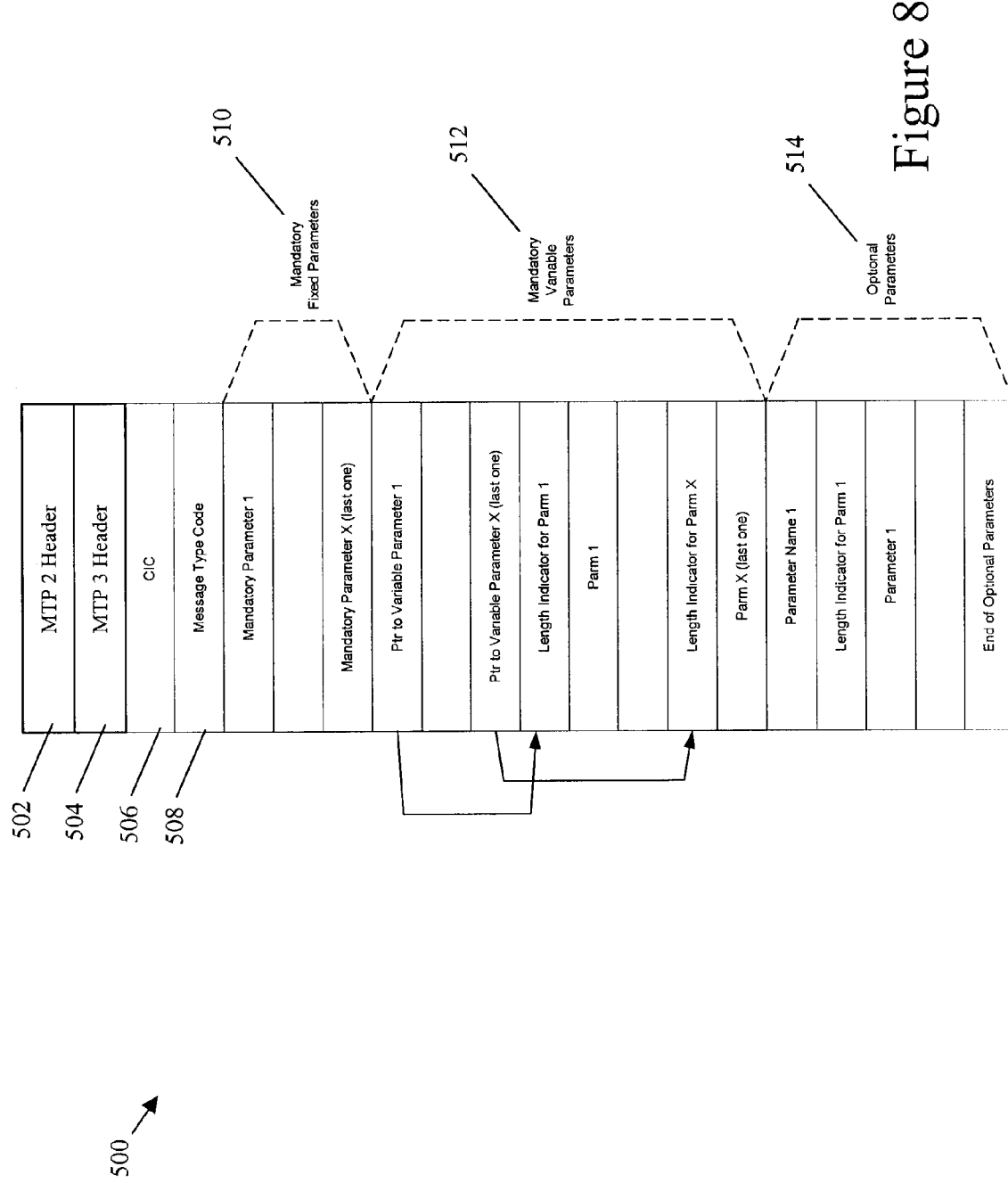
FIG. 8 is a message format diagram illustrating the generic structure of an ISDN user part (ISUP) signaling message.

As stated above, NSG routing node 300 according to the present invention converts ISUP messages of a particular national format to a common format and vice versa. FIG. 8 is a simplified diagram of a typical SS7 ISUP message signaling unit (MSU) 500 that is received, processed, and transmitted by an SS7 communication module, such as LIM 330 of MSG routing node 300. In FIG. 8, ISUP MSU 500 includes a message transfer part level 2 (MTP2) header 502, a message transfer part level 3 (MTP3) header or routing label 504, a circuit identification code (CIC) parameter 506, a message type indicator 508, a mandatory fixed length parameters segment 510, a mandatory variable length parameters segment 512, and an optional parameters segment 514.

Each ISUP message contains a message type field that identifies the particular type or nature of the ISUP message. The message type is always the same size (1 byte) and is always in the same location (first byte after the CIC field). A set of ISUP parameters is defined by each ISUP specification, many of which are used in multiple message types. As indicated in FIG. 8, there are 3 types of message parameters: mandatory fixed (the parameter is of a fixed size and must be present in the message), mandatory variable (the parameter is of a variable size and must be present in the message), and optional. According to the ITU Q.763 and ETSI V3 standards, a range of encodings (0xE0 to 0XFF) is reserved for national use in both the message type and parameter code definitions.

The combination of message type and ISUP specification being used uniquely identifies the parameters that are applicable to the message and further implies the number of and order of the mandatory fixed and mandatory variable parameters. When a particular message contains more than one mandatory fixed parameter, the order of those parameters is fixed and is detailed in the relevant ISUP specification. Similarly, when a particular message contains more than one mandatory variable parameter, the order of those parameters is fixed and is detailed in the relevant ISUP specification. The order of optional parameters within an ISUP message is not fixed. Unlike the mandatory fixed and mandatory variable sections of the ISUP messages, the option parameter section provides the parameter id as the first field within each parameter.

As such, ISUP messages and their headers, parameters, and data segments are well known to those in the SS7 telecommunications industry, a more detailed discussion as such is not presented herein. However, an in depth consideration of the SS7 signaling protocol and ISUP related signaling procedures can be found in *Signaling System #7* by Travis Russell, McGrawHill Publishing (1998) and the above-referenced Telcordia SS7 specification.

Data Communication Module (DCM) Architecture

Figure 9:
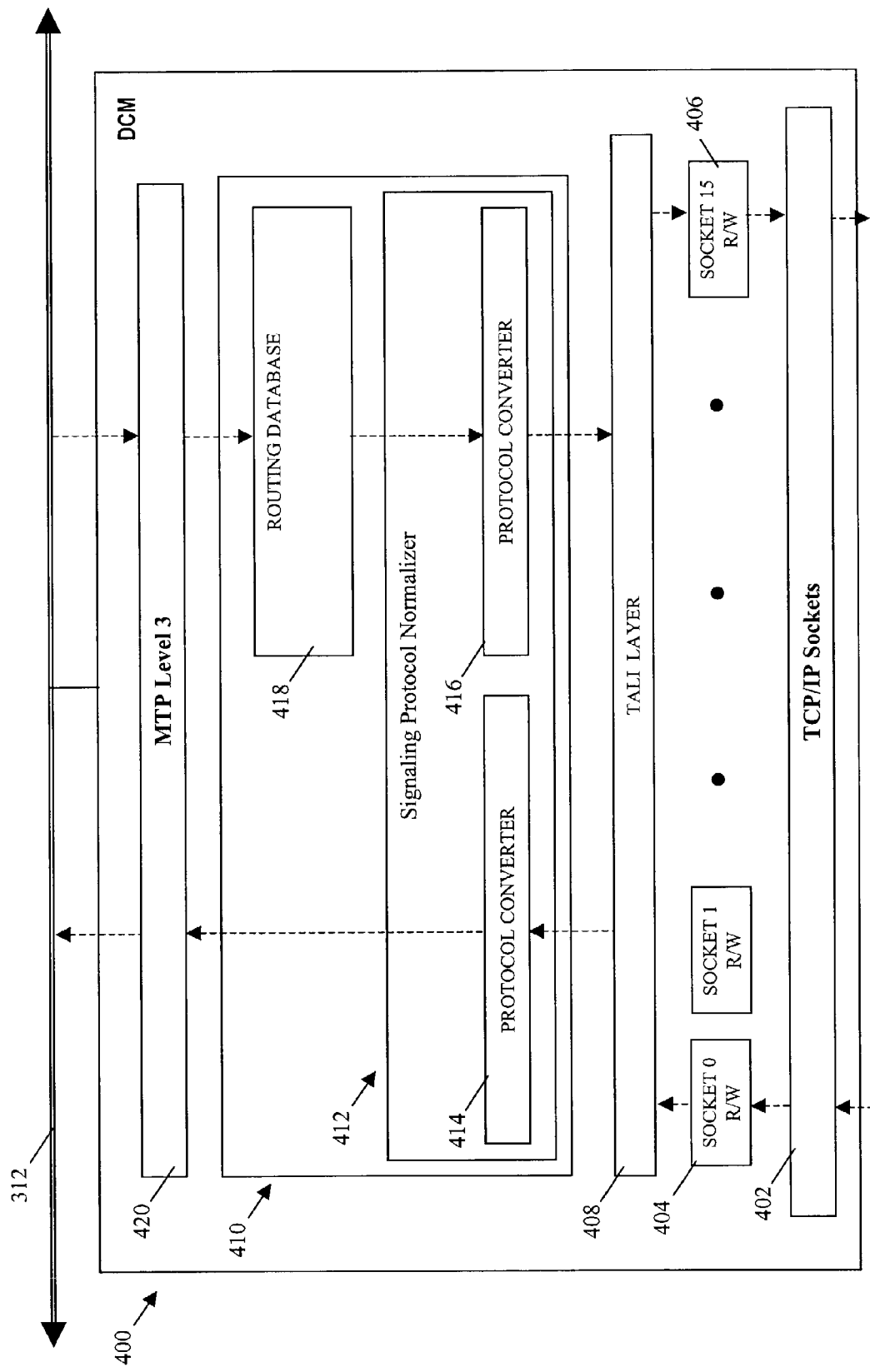
FIG. 9 is a block diagram of an Internet protocol (IP) capable data communication module (DCM) that provides ISUP normalizing functionality according to an embodiment of the present invention.

FIG. 9 illustrates a data communication module (DCM) of the present invention, generally indicated by reference numeral 400. DCM 400 is connected to IMT communication bus 312 and includes a number of functional processes or modules. In the illustrated example, these modules include a TCP/IP sockets layer 402 for administering lower level TCP/IP protocol functions associated with up to 16 TCP/IP sockets. TCP/IP sockets layer 402 provides a TCP socket interface to a TCP/IP protocol stack. DCM 400 also includes a plurality of TCP/IP socket read/write processes for buffering and performing basic input/output (I/O) operations for each socket. In the example presented in FIG. 9, a pair of socket read/write processes are specifically identified as socket 0 R/W process 404 and socket 15 R/W process 406. Also included on DCM 400 is a TALI layer 408 for adding or removing appropriate TALI header information to outgoing or incoming message packets, and an application layer 410 for processing messages received from TALI layer 408.

According to an important aspect of the invention, application layer 410 includes a signaling protocol normalizer, generally indicated by reference numeral 412. In the embodiment illustrated in FIG. 9, normalizer 412 includes a pair of converter modules 414 and 416. Normalized-to-variant protocol converter 414 receives normalized SS7 ISDN user part (ISUP) data from TALI layer 408 and builds a variant ISUP message from the normalized data. Conversely, Variant-to-normalized protocol converter 416 receives SS7 ISUP variant signaling messages from a PSTN network and constructs a normalized SS7 ISUP payload to be encapsulated in a TALI packet. Preferred packet formats for encapsulating various types of SS7 messages in IP packets are described in the above-referenced TALI RFC. The TALI format for ISUP messages may be used to encapsulate normalized ISUP messages according to the present invention. Briefly, encapsulating a normalized ISUP message in a TALI payload includes adding a TALI header to the normalized ISUP message and encapsulating the entire ISUP message in the data portion of the ISUP message. An exemplary TALI message format for storing ISUP messages will be explained in detail below.

Although the TALI protocol provides a convenient format for communicating SS7 messages to IP nodes, the present invention is not limited to using the TALI protocol. Other suitable protocols, such as M3UA over SCTP, may be used without departing from the scope of the invention.

Application layer 410 also includes a routing database 418, which includes a routing key table 420 (FIG. 10) and a sockets table 450 (FIG. 11). As indicated in FIG. 10, routing key table 420 has a plurality of routing key fields including a destination point code (DPC) field 422, an origination point code (OPC) field 424, a service indicator (SI) field 426, a circuit identification code start (CICS) field 428, a circuit identification code end (CICE) field 430, and a subsystem number (SSN) field 432. Each entry in routing key table 420 includes a TCP/IP socket identifier 434, a normalization flag 436, and a PSTN presentation parameter 438. Socket identifier 434 is used as an index to a particular entry in the socket table 450. Normalization flag 436 is adapted to indicate whether normalization or de-normalization processing is required for signaling messages traversing a particular route. In one embodiment of the present invention, the PSTN presentation parameter 438 a 32-bit value that specifies the ISUP variant from which a signaling message was normalized or the ISUP variant to which the message is to be de-normalized.

The present invention is not limited to routing messages using the routing keys illustrated in FIG. 10. Any suitable signaling message routing key or routing keys is intended to be within the scope of the invention. Referring to FIG. 11, sockets table 450 is indexed by a socket identifier 452, which is associated with local end TCP/IP connection information 454 and distant end TCP/IP connection information 456. Each entry in the socket table also includes a socket status parameter 458, which indicates the availability status of each socket defined in the table.

Figure 12:
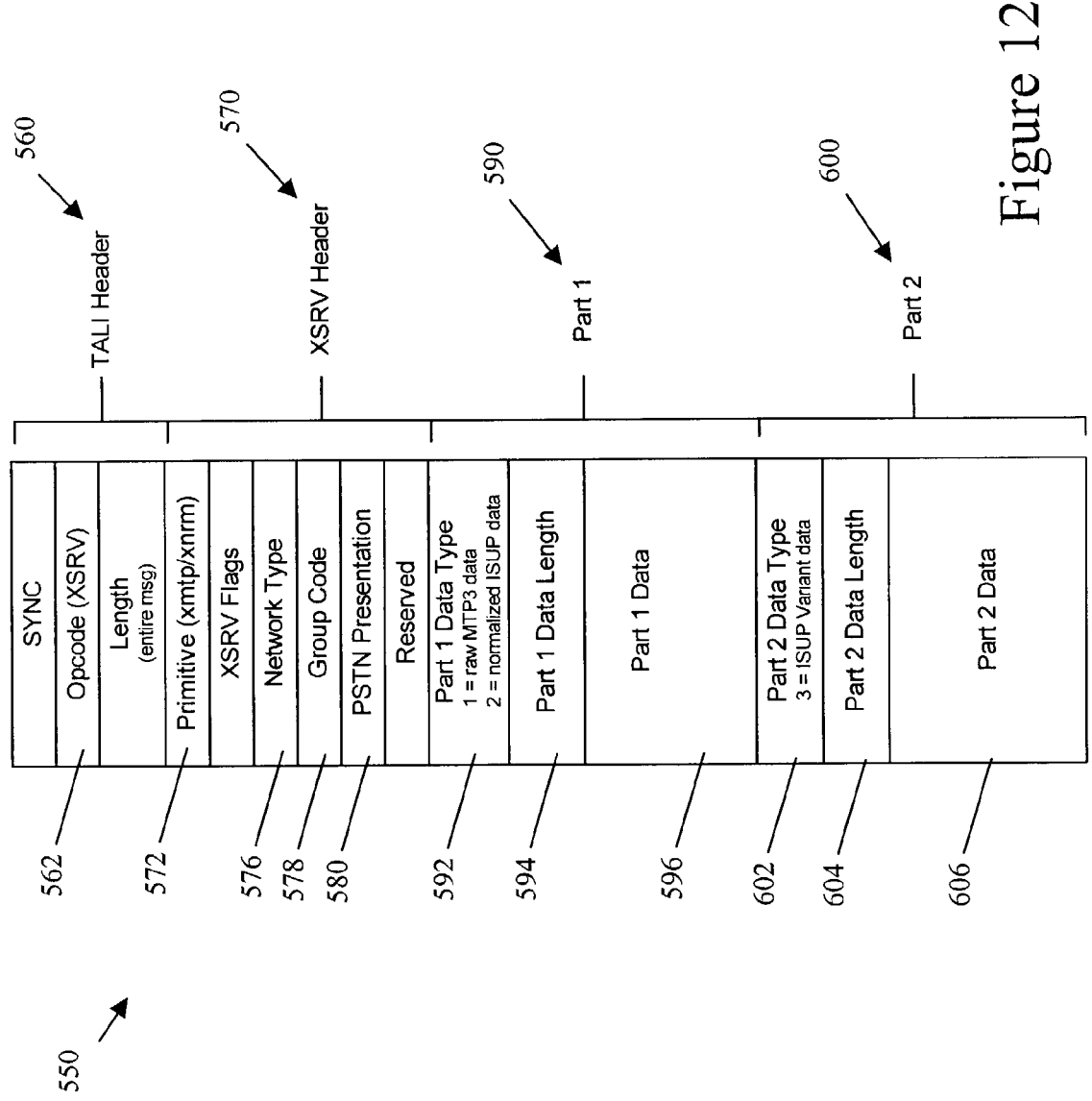
FIG. 12 is a message format diagram illustrating an exemplary transport adapter layer interface (TALI) packet structure associated with a normalized ISUP message according to one embodiment of the present invention.

FIG. 12 illustrates an exemplary TALI packet format for carrying normalized signaling messages according to embodiments of the present invention. In the illustrated example, the TALI extended service (XSRV) packet is used. In FIG. 12, TALI XSRV packet 550 has several segments including a TALI header segment 560, an XSRV header segment 570, a common or part 1 data segment 590, and a variant or part 2 data segment 600. TALI header segment 560 includes an opcode parameter 562. XSRV header segment 570 includes an XSRV primitive parameter 572, one or more XSRV flags 574, a network type parameter 576, a group code parameter 578, and a PSTN presentation parameter 580. The common or part 1 data segment 590 includes a data type parameter 592, a data length parameter 594, and a data payload parameter 596. In one embodiment, a part 1 data type parameter value of "1" indicates that the associated part 1 data payload parameter 596 contains raw MTP3 data, while a part 1 data type parameter value of "2" indicates that the associated part 1 data payload parameter 596 contains normalized ISUP data. Likewise, the variant or part 2 data segment 600 includes a data type parameter 602, a data length parameter 604, and a data payload parameter 606. Again, in one embodiment, a part 2 data type parameter value of "3" indicates that the associated part 2 data payload parameter 606 contains ISUP variant data. Thus, in one case, the part 1 data segment of a TALI XSRV packet may contain a common or normalized component of ISUP data, while the part 2 data segment may contain a variant specific component of ISUP data.

Given the normalized TALI XSRV packet structure described above, it will be appreciated that normalized ISUP over TALI message includes 3 major parts: (1) a header containing fields that indicate how the content of the packet should be interpreted, (2) a common or normalized ISUP MSU section or segment (i.e., part 1 data segment) used to store ISUP MSU data that conforms to a standard or normalized ISUP MSU encoding specification (i.e., the data stored here is a normalized ISUP MSU that represents the best ETSI V3 ISUP packet that can be created from the original ISUP variant MSU), and (3) a variant specific data section or segment (i.e., part 2 data segment) that consists of zero or more instances of a data structure which contain variant specific information related to an ISUP parameter that was not "cleanly mapped" to an associated or related parameter in the normalized ISUP protocol.

One motivation for retaining the variant-specific information as part of the normalized ISUP TALI XSRV message is to guarantee that intra-country calling features which require variant-specific messages and parameters can continue to work for those intra-country calls. By retaining the variant-specific portions of the original ISUP messages, it is possible to re-create the original ISUP variant MSU, and thereby facilitate country specific calling services and features that are made possible only by the variant ISUP protocol.

With regard to opcode parameter 562 contained in the TALI header segment 560, an opcode value of "XSRV" is used to indicate an XSRV type TALI message. The XSRV primitive parameter 572 may contain a value of "XMTP" which indicates a raw message transfer part level 3 (MTP3) data payload format, or a value of "XNRM" which indicates a normalized ISUP payload format. A TALI XSRV-XMTP packet can be used to transport raw SS7 MTP3 message signaling unit (MSU) data beginning at the MTP3 service indicator octet (SIO) byte. As such, it should be noted that TALI XSRV-XMTP packets are not limited to transporting raw SS7 ISUP messages. These packets may also be used to transport raw transaction capabilities application part (TCAP) and mobile application part (MAP) MSU data. The benefit of such a header encoding technique over conventional ISUP MTP3 header encoding is that additional information about the type of signaling network, the ITU-National group (i.e., group code), and the format of the associated MTP3 data is also conveyed in the XSRV-XMTP packet header to assist the receiving node in determining how to decode and process the encapsulated MSU data.

The network type parameter 576 is present in both TALI XSRV-XMTP and XSRV-XNRM type packets to enable the recipient of a packet to effectively and efficiently interpret the MTP3 routing label of the MSU payload. The network type parameter is used to differentiate an ANSI MSU from an ITU-National MSU since the MTP3 SIO field specifies "National Network" for both of these MSU types, but the routing label has a different format in each MSU. In one embodiment of the present invention, the network type parameter may have one of three values: a "0" which indicates that the MTP3 routing label of the encapsulated SS7 ISUP MSU is in an ANSI/Bellcore format, a "1" which indicates that the MTP3 routing label of the encapsulated SS7 ISUP MSU is in an ITU-International format, or a "2" which indicates that the MTP3 routing label of the encapsulated SS7 ISUP MSU is in an ITU-National format.

Group code parameter 578 permits ITU-National destinations to be divided into groups. Group codes may also be used to represent individual countries or national networks. A single group may be defined to include multiple countries, and, conversely, a single country may be assigned multiple group codes. Group codes are primarily used to solve a duplicate point code addressing scenario that can arise when a particular ITU-National point code address exists in more than one ITU-National network served by a single NSG routing node. By internally assigning a group code to each ITU-National point code address, an NSG routing node of the present invention is capable of distinguishing between two nodes even when they share the same SS7 point code address.

PSTN presentation parameter 580 is used to indicate the format of the SS7 MTP3 payload. One embodiment of the present invention employs a 32-bit PSTN presentation parameter that is organized into a 16-bit PSTN category component and a 16-bit PSTN identification component. It should be noted that depending upon the particular context in which the parameter is examined, final interpretation of a PSTN presentation parameter value may vary. That is, when an ISUP variant MSU is received by an NSG routing node from a PSTN network, the PSTN presentation parameter is interpreted as indicating how to decode the ISUP variant message prior to normalization processing. When a normalized ISUP packet is received by an NSG routing node, the PSTN presentation parameter is interpreted as indicating how to encode a corresponding ISUP variant message prior to delivery to a node in a PSTN network. When a TALI XSRV-XNRM packet is received by an IP node (e.g., an MGC, a softswitch, etc.), the PSTN presentation parameter is interpreted as indicating how to decode the variant specific part 2 data segment contained in the packet and what signaling procedures should apply. When a TALI XSRV-XMTP packet is received by an IP node (e.g., MGC, softswitch, etc.), the PSTN presentation parameter is interpreted as indicating how to decode the raw MTP3 data segment contained in the packet.

Referring back to FIG. 6, in addition to the functions or sub-processes 414 and 416, signaling protocol normalizer 412 includes one or more data structures for storing rules for performing the normalization and de-normalization of signaling messages. FIG. 13 illustrates an example of some of the types of information that are stored in memory of DCM 400 and accessed by signaling protocol normalizer 412. More particularly, table 470 contains a listing of normalized ISUP protocol message types that are also defined within the German national ISUP protocol variant, where the German national ISUP protocol is defined in the above-referenced German ISUP protocol specification. The normalized ISUP protocol may be any suitable signaling protocol, such as the ISUP protocol defined by the European Telecommunications Standards Institute (ETSI) V3 standard which is described in *ETSI V3 ISUP, European Telecommunication Standard ETS* 300 356-1 *V3.2.2* (1998-08),*ISDN SS7 ISDN User Part version 3 for the International Interface; Part 1: Basic Services,* 1998. Alternatively, the normalized ISUP protocol may be any other ISUP protocol (e.g., ANSI ISUP, ITU-International ISUP, etc.).

As indicated in FIG. 13, common ISUP message type table 470 includes a PSTN presentation ID field 472, a message type field 474, a message type acronym field 476, and a message type identifier code field 478. Using the information provided in table 470, in conjunction with message normalization rules such as those illustrated in FIG. 14, it can be determined whether and/or how a received German ISUP variant MSU type can be mapped into a new normalized signaling message packet. More particularly, the message normalization rules presented in table 480 in FIG. 14 indicate how to handle specific message processing and normalizing scenarios based on the type(s) of messages involved and the context of the processing. The message normalization rules table structure 480 depicted in FIG. 14 is presented primarily for the purposes of illustration. A practical implementation of a normalization rules table may involve a more complex data structure. In FIG. 14 rules table 480 contains a number of fields including a scenario ID field 482, a message source field 484, a message destination field 486, a condition field 488, and a message normalization rule field 490.

Even though a message type may be shared by the German ISUP variant and the normalized ISUP protocols, it is possible that the individual parameters within the common message type may not map cleanly between the two ISUP protocols. As such, parameter-specific translation processing may also be required. One embodiment of the present invention includes a parameter translation indicator table 650, as shown in FIG. 15. Once again, it will be appreciated that the parameter translation indicator table structure 650 depicted in FIG. 15 is presented primarily for the purposes of illustration, and that practical implementation of a translation indicator table may involve a more complex data structure. In any event, the table 650 shown in FIG. 15 contains a number of fields including a PSTN presentation ID field 652, a parameter name field 654, a parameter acronym field 656, a parameter code field 658, a parameter structure identifier or pointer 660, a parameter structure comparison field 662, a parameter literal comparison field 664, and a parameter translation indicator field 666.

In the event that particular parameter in an ISUP variant protocol does not map cleanly to the normalized ISUP protocol and consequently requires translation (i.e., translation indicator value is "Yes"), a parameter translation index or pointer table is consulted. A sample parameter translation index table 670 is presented in FIG. 16 and includes a PSTN presentation ID field 672, a parameter acronym field 674, a parameter field identifier 676, a parameter discrepancy description field 678, a translation rule identifier or pointer for a German to Normalized ISUP processing scenario 680, and a translation rule identifier or pointer for a Normalized to German ISUP processing scenario 682. Specific parameter translation rules or instructions are stored in a parameter translation rule table 690, as indicated in FIG. 17. Once again, the parameter translation rule table structure 690 depicted in FIG. 17 is presented primarily for the purposes of illustration. Practical implementation of a normalization rules table may include a potentially more complex data structure. In any event, the sample data table structure 690 shown in FIG. 17 contains a number of fields including a translation rule or scenario identifier 692, a message source field 694, a message destination field 696, a condition field 698, and a parameter translation rule field 700.

Referring again to FIG. 9, DCM 400 also includes a message transport protocol (MTP) level 3 module 420 and additional functional processes beyond those depicted in FIG. 9. MTP level 3 module 420 may perform message distribution and routing functions similar to those described above with respect to FIG. 5.

ISUP Variant-to-Normalized ISUP Processing

Figure 18:
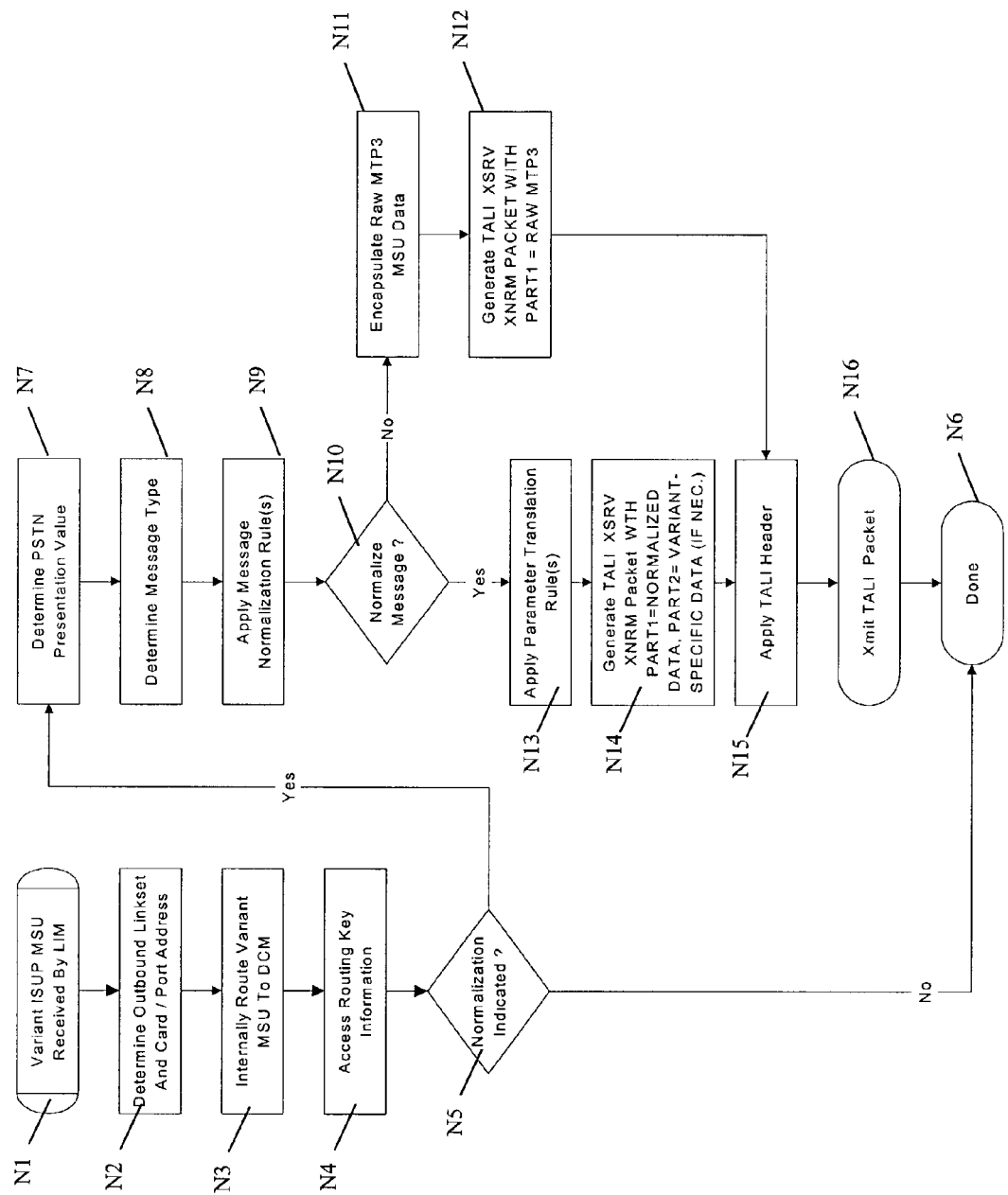
FIG. 18 is a flowchart illustrating exemplary signaling message processing associated with normalizing operations according to an embodiment of the present invention.

FIG. 18 is a process flow diagram illustrating an exemplary ISUP normalization process in an NSG routing node according to an embodiment of the present invention. The DCM diagram presented in FIG. 9, which includes sample message flows, may be used in conjunction with the processing flow chart of FIG. 18 to better understand the normalization of ISUP variant messages received by an NSG routing node. For the purposes of illustration, it is assumed that an SS7 ISUP signaling message is received at NSG 300 from German signaling network 120 (FIG. 3), and that the signaling message is formatted in a German ISUP variant described in the above-referenced German ISUP protocol specification.

Beginning at LIM card 330 (FIG. 5), the SS7 signaling message is received (N1) and SS7 MTP Level 1 and 2 processing is performed on the incoming signaling message by the MTP Level 1 and 2 processes 332 and 334, respectively. Once again, MTP level 1 module 332 sends and receives digital data over a particular physical medium, while MTP level 2 module 334 performs error detection, error correction and ensures sequenced delivery of SS7 message packets. With MTP Level 1 and 2 processing complete, the signaling message packet is temporarily buffered in the I/O queue 336 before being passed up the stack to MTP Level 3 HMDC module 338. HMDC module 338 examines the signaling message packet and determines whether the packet requires processing by the NSG node 300. In one embodiment, HMDC process 338 may associate a 10-bit group code value (e.g., "DE", "UK", etc.) with the received signaling message based on the inbound signaling linkset or link.

HMDC module 338 associated with the inbound signaling link store or maintain the group code-to-signaling link association, or HMDC module 338 may access linkset table 370 (FIG. 7) to determine the appropriate group code on a per received message basis. For the purposes of illustration, it is assumed that HMDC module 338 accesses linkset table 370 in order to determine the appropriate group code that is to be associated with a received signaling message. HMDC module 338 then passes the signaling message and the associated group code to routing module 340 for further routing processing. HMRT module 340 the accesses routing and group code database 344 in order to determine how and where the message should be routed. More particularly, using a destination point code parameter contained in the received signaling message and the associated group code provided by HMDC 338, HMRT module 340 accesses table 350 (FIG. 6), and determines the linkset associated with the lowest cost route to the destination point code address. As such, a subsequent lookup is performed in linkset table 370 using, in part, the selected linkset. Those skilled in the art of SS7 message routing will appreciate that variety of approaches are employed to select a particular SS7 signaling link within a signaling linkset. Furthermore, it should be appreciated that the signaling link selection algorithm employed in a NSG node of the present invention is not particularly relevant to the present invention, and as such, SS7 link selection algorithms are not discussed in detail herein.

Once a particular signaling link within the selected linkset has been selected, the corresponding physical address of the associated communication module and communication port are extracted from the linkset table 350, as indicated in step N2. Using this information, the signaling message is, in this example, routed internally via IMT bus 312 to DCM 400 for normalization processing and subsequent transmission to or towards the destination node (step N3).

Once received by DCM 400, the German ISUP variant message is examined and certain parameters in the message including an originating point code (OPC), destination point code (DPC), service indicator (SI), and circuit identification code (CIC) may be used to select the appropriate or matching routing key entry in routing key table 420 (step N4). The normalization indicator flag associated with the matching routing key entry is next examined to determine whether normalization processing is to be performed (step N5). If normalization processing is not indicated, normalization of the German ISUP variant message is not performed and no further normalization related processing is performed on the message (step N6). However, if normalization processing is indicated, the PSTN presentation parameter associated with the matching routing key entry is used to determine the particular type of normalization processing that is to be performed (step N7).

When an ISUP variant MSU is received by an NSG routing node from a PSTN network, the PSTN presentation parameter is interpreted as indicating how to decode the ISUP variant message prior to normalization processing. The message type parameter of the variant ISUP MSU is also examined (step N8), and this information, together with the associated PSTN presentation value, is used to facilitate decoding of the German ISUP variant MSU. More particularly, variant-to-normalized protocol converter 416 accesses common or shared message table 470 (FIG. 13) to determine whether the received German ISUP variant message is of a type that is defined in the normalized ISUP protocol. In one embodiment, this may be accomplished using the PSTN presentation value and a message type identifier that is decoded from the German ISUP variant MSU. If the PSTN presentation ID and the message type match one of the entries in table 470, the message is determined to require further normalization processing.

Treatment or processing of the German ISUP variant MSU is determined based on the message normalization rules or scenarios defined in table 480 (steps N9 and N10). For example, as indicated in scenario "M-5A" shown in table 480, if the received German ISUP variant MSU is destined for an IP node that employs the normalized ISUP protocol, and the message type of the German ISUP MSU is not defined in the normalized protocol, then the German ISUP variant MSU is not normalized. Instead, the German ISUP variant MSU is transmitted to the destination node via a TALI XSRV-XNRM packet where part 1 of the packet carries raw MTP3 data from the ISUP variant MSU (steps N11 and N12).

In another possible normalization scenario such as "M-10A", the contents of the received German ISUP variant MSU are to be normalized. In such a case, a message type may be common both the German and normalized ISUP protocols, but the parameters and/or parameter structures contained within that message type may differ between the two protocols. As such, it is necessary to segregate or sort the parameters contained within the German variant ISUP MSU into those that are common to the normalized ISUP protocol and those that are not common to the normalized ISUP protocol. With particular regard to those parameters that are determined to be common to the normalized ISUP protocol, conversion or translation of such message parameters may be required as a part of the normalization process.

In one embodiment, parameter translation indicator table 650 (FIG. 15) is accessed using the received German ISUP variant MSU message type and PSTN presentation to determine whether parameter specific translation is required (step N13). For example, as indicated by parameter structure field 664, German ISUP variant "Backward Call Indicator" parameter has a parameter structure that is not the same as the equivalent normalized ISUP "Backward Call Indicator" parameter. Consequently, parameter structure related translation of the "Backward Call Indicator" parameter may be required. As further indicated by parameter literal field 666, the German ISUP variant "Backward Call Indicator" parameter literal is not the same as the equivalent normalized ISUP "Backward Call Indicator" parameter literal. Consequently, parameter literal related translation of the German ISUP "Backward Call Indicator" parameter may also be required.

In the event that parameter translation processing is indicated, table 670 (FIG. 16) is next consulted to determine the relevant parameter translation scenario. In the case of variant ISUP-to-normalized ISUP processing, the German to normalized scenario field 680 returns a pointer to the appropriate translation rule entry or record in parameter translation rule table 690. Using the relevant data and translation rule information from tables 670 and 690, an ISUP message parameter requiring translation or conversion is processed. For example, as shown in parameter translation index table 670, the "Holding Indicator" field is reserved in the German ISUP variant protocol but is defined in the normalized protocol. Consequently, a pointer to the "P11-A" parameter translation scenario rule is associated with this parameter.

Once parameter translation processing is complete, each parameter that is present in the received German variant ISUP MSU will have been evaluated (and translated if necessary) and subsequently placed within the appropriate data segment of a TALI packet, such as TALI XSRV-XNRM packet 550 shown in FIG. 12. That is, based on the results of the parameter translation process described above, each parameter contained in the original German ISUP variant MSU may be placed in either the common or normalized specific part 1 data segment 590, or placed in the variant specific part 2 data segment 600 of TALI XSRV-XNRM packet 550, depending upon the message 480 and the translation rules (step N14). Once all necessary parameter translation processing has been performed, the appropriate TALI XSRV header information is incorporated by TALI application layer 408 thereby forming a complete TALI packet (step N15). The TALI XSRV packet is then directed to TCP/IP socket read/write process 406 and subsequently transmitted into the associated IP network via TCP/IP socket layer 402, as indicated in step N16.

Normalized ISUP-to-ISUP Variant Processing

With regard to the "de-normalization" of normalized ISUP messages, it will be appreciated that such operations involve processing that is essentially the opposite or reverse of that described above. That is, the information contained in the common part 1 and variant part 2 data segments of a TALI XSRV packet is extracted, translated (if necessary), and re-assembled into a complete German ISUP variant MSU, which can then be routed to an SS7 node or destination.

Figure 19:
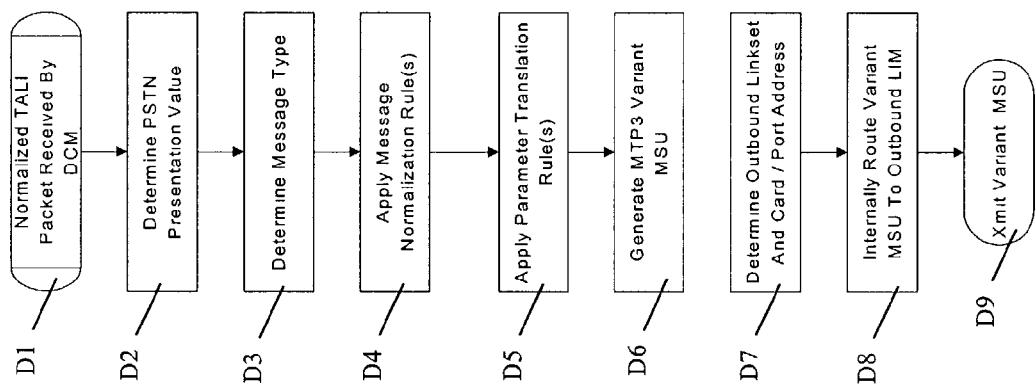
FIG. 19 is a flowchart illustrating exemplary signaling message processing associated with de-normalizing operations according to an embodiment of the present invention.

FIG. 19 is a process flow diagram that illustrates the ISUP de-normalization process in an NSG routing node of the present invention. The DCM diagram presented in FIG. 9, which includes sample message flows, may again be used in conjunction with the processing flow chart of FIG. 19 to better understand the de-normalization of ISUP variant messages received by an NSG routing node. For the purposes of illustration, it is assumed that a TALI XSRV-XNRM packet containing both normalized and variant ISUP data segments is received at the NSG 300 from MGC node 302 (FIG. 3), and that the information in the TALI packet is to be relayed to an SS7 signaling node in the German SS7 network 120. Once again, it is assumed for the purposes of illustration that the particular ISUP protocol employed in German network 120 is an ISUP variant described in the above-referenced German ISUP protocol specification.

Beginning at the inbound DCM card 400 (FIG. 9), the TALI XSRV-XNRM packet is received (D1) via a TCP/IP socket connection that is supported by socket layer 402 and socket read/write process 404. TALI header information is examined and removed by TALI layer 408, and the contents of the TALI XSRV-XNRM packet are passed to normalizer 412. More particularly, the TALI package contents including the normalized and variant TALI payload segments are directed to the normalized-to-variant protocol converter 414. In one embodiment, converter 414 examines the PSTN presentation parameter 580 (FIG. 12) contained in the TALI packet in order to determine the particular type of de-normalization processing that is to be performed (step D2). Once again, it will be recalled that when a normalized TALI packet is received by an NSG routing node from an IP network, the PSTN presentation parameter is interpreted as indicating the particular ISUP protocol variant that is to be used when generated the SS7 ISUP MSU. In an alternate embodiment, routing key table 420 may provide the appropriate PSTN presentation value for a received TALI packet. That is, a PSTN presentation value may be determined based on a matching routing key entry in the routing key table 420.

In any event, a message type parameter contained in the normalized TALI packet contents also examined (step D3) and this information, together with the associated PSTN presentation value, is used to facilitate the decoding of the normalized ISUP data and subsequent encoding of an associated German ISUP variant MSU. More particularly, normalized-to-variant protocol converter 414 accesses the common or shared message table 470 (FIG. 13) to determine whether the received normalized ISUP message is of a type that is defined in the German ISUP variant protocol. In one embodiment, this may be accomplished using the PSTN presentation value and a message type identifier that is decoded from the normalized ISUP message. Treatment or processing of the normalized TALI packet data is then determined based on the message normalization rules or scenarios defined in table 480 (step D4).

As the TALI XSRV-XNRM packet is generally comprised of a normalized segment and a variant segment, the construction of a German ISUP MSU requires the extraction of parameters from each of these TALI segments and the subsequent re-assembly of these parameters in a sequence and format that is defined by the German ISUP protocol. Conversion or translation of message parameters may be required as a part of the de-normalization process, and in one embodiment the parameter translation indicator table 650 (FIG. 15) is accessed using the received normalized ISUP message type and PSTN presentation to determine whether parameter specific translation is required (step D5).

Once all parameters in from the TALI common or part 1 segment and variant or part 2 segment have been extracted, translated (if necessary), and re-assembled into the appropriate German ISUP protocol format, the resulting MTP3 MSU is internally routed via IMT bus 312 to the appropriate outbound LIM card, as indicated in steps D6 through D8. Once received by the outbound LIM card, the appropriate MTP level 1 and level 2 content is added, and the complete German ISUP variant MSU is routed into German SS7 network 120.

An NSG routing node of the present invention receives signaling messages formatted according to a variant of a common or standard ISUP signaling protocol and subsequently create new "normalized" signaling messages based on the received ISUP variant message, and vice versa. The new normalized signaling messages include a normalized component and a variant component. The normalized component contains information that is common to all of the protocol variants that are being supported by the NSG node. Consequently, an IP node served by an NSG node of the present invention is required only to receive, interpret, and process a single signaling protocol (i.e., a normalized protocol), regardless of the number of different signaling protocol variants supported by the serving NSG node.

It will also be appreciated that various details of the invention may be changed without departing from the scope of the invention. Furthermore, the foregoing description is for the purpose of illustration only, and not for the purpose of limitation—the invention being defined by the claims.

What is claimed is:

1. A method for processing messages formatted according to different variations of a standard signaling protocol, the method comprising:
   (a) receiving a first signaling system 7 (SS7) Integrated Services Digital Network (ISDN) User Part (ISUP) message formatted according to a variant of a standard ISUP protocol, the first message including a plurality of parameters;
   (b) creating, based on the first message, a second message including a normalized portion including parameters common to a normalized ISUP protocol and the variant and a variant portion including parameters that do not map directly between the normalized ISUP protocol and the variant; and
   (c) transmitting the second message to a network element.

2. The method of claim 1 wherein receiving a first SS7 ISUP message formatted according to a variant of a standard ISUP protocol includes receiving a message formatted according to an ISUP standard used by a particular national network.

3. The method of claim 1 wherein receiving a first SS7 ISUP message formatted according to a variant of a standard ISUP protocol includes receiving a message formatted according to a variant based on ITU Recommendations Q.761-Q.764.

4. The method of claim 1 wherein the normalized ISUP protocol is the European Telecommunications Standards Institute Version 3 (ETSI V3) ISUP protocol.

5. The method of claim 1 wherein creating a second message includes creating a transport adapter layer interface (TALI) message.

6. The method of claim 1 wherein creating a second message includes creating a Message Transfer Part (MTP) level 3 user adaptation layer message.

7. The method of claim 1 wherein the normalized ISUP portion includes parameters in the first ISUP message defined in and supported by the normalized ISUP protocol.

8. The method of claim 1 comprising translating parameters in the first ISUP message that are defined in and supported by the normalized ISUP protocol to the normalized ISUP protocol.

9. The method of claim 1 wherein the variant portion includes parameters in the first ISUP message not defined in or supported by the normalized ISUP protocol.

10. The method of claim 1 wherein transmitting the second message to a network element includes transmitting a message to a media gateway controller (MGC).

11. The method of claim 1 wherein receiving a first message formatted according to a variant of a first SS7 ISUP protocol includes receiving a message formatted according to the American National Standards Institute (ANSI) ISUP protocol standard.

12. The method of claim 1 wherein receiving a first message which is formatted according to a variant of a first SS7 ISUP protocol includes receiving a message formatted according to the International Telecommunications Union—International (ITU-I) ISUP protocol standard.

13. A network element for enabling a first signaling network element that employs a first signaling system 7 (SS7) Integrated Services Digital Network (ISDN) user part (ISUP) signaling protocol to communicate with a second network element that employs a variant of the first ISUP signaling protocol, the network element comprising:
   (a) a first communication module for receiving a first signaling message formatted according to a variant of the first ISUP signaling protocol;
   (b) a normalizer for receiving the first message from the first communication module, extracting information from the first message, and creating a second signaling message including a normalized ISUP component and a variant component, the normalized ISUP component including parameters common to the variant and the first ISUP signaling protocol and the variant component including parameters that do not map directly between the variant and the first ISUP signaling protocol; and
   (c) a second communication module associated with the normalizer for transmitting the second signaling message.

14. The network element of claim 13 wherein the first communication module is an SS7 link interface module (LIM).

15. The network element of claim 13 wherein the first SS7 ISUP protocol is defined by the European Telecommunications Standards Institute Version 3 (ETSI V3) ISUP protocol standard.

16. The network element of claim 13 wherein the first SS7 ISUP protocol is defined by the American National Standards Institute (ANSI) ISUP protocol standard.

17. The network element of claim 13 wherein the first SS7 ISUP protocol is defined by the International Telecommunications Union—International (ITU-I) ISUP protocol standard.

18. The network element of claim 13 wherein the variant of the first SS7 ISUP protocol comprises an ISUP variant specific to a particular national network.

19. The network element of claim 13 wherein the second message is a transport adapter layer interface (TALI) message.

20. The network element of claim 13 wherein the second message is a message transfer part layer 3 user adaptation layer (M3UA) message.

21. The network element of claim 13 including a parameter translation process for translating parameters into a normalized format.

22. The network element of claim 13 wherein the second communication module is an Internet protocol (IP) capable data communication module (DCM).

23. The network element of claim 13 wherein transmitting the second message includes transmitting the second message to a node in an Internet protocol (IP) network.

24. The network element of claim 23 wherein the node is a media gateway controller (MGC).

25. A communications module for converting signaling messages to and from a normalized format, the communications module comprising:
(a) a transport layer module for sending and receiving packets over a network;
(b) a transport adapter layer module for receiving packets from the transport layer module and for sending packets to an application layer module; and
(c) an application layer module including a signaling protocol normalizer for converting packets received from the transport adapter layer module between a variant of a standard ISDN User Part (ISUP) protocol format and a normalized ISUP protocol format, wherein the transport layer module, the transport adapter layer module, and the application layer module comprise computer-executable instructions embodied in a computer readable medium, wherein the normalized ISUP protocol format includes messages having a first portion for storing parameters common to the normalized ISUP protocol and the protocol of a received signaling message and a second portion for storing parameters that do not map directly between the normalized protocol and the protocol of the received signaling message.

26. The communications module of claim 25 wherein the transport layer module is configured to send and receive Transmission Control Protocol (TCP) packets and the transport adapter layer module is configured to send and receive Transport Adapter Layer Interface (TALI) packets.

27. The communications module of claim 25 wherein the transport layer module is configured to send and receive stream control transmission protocol packets.

28. A communications module for converting signaling messages to and from a normalized format, the communications module comprising:
(a) a transport layer module for sending and receiving packets over a network;
(b) a transport adapter layer module for interfacing between the transport layer module and higher protocol layer modules; and
(c) an application layer module including a signaling protocol normalizer for converting packets received from the transport adapter layer module to and from a normalized protocol format,
wherein the transport adapter layer generates a transport adapter layer header including a parameter indicating whether a transport adapter layer payload carries data formatted according to the normalized protocol format; and,
wherein the transport layer module, the transport adapter layer module, and the application layer module comprise computer-executable instructions embodied in a computer readable medium.

* * * * *